United States Patent [19]

Heibel et al.

[11] Patent Number: 5,053,947

[45] Date of Patent: Oct. 1, 1991

[54] EXTENDED MULTISTATION BUS SYSTEM AND METHOD

[75] Inventors: John T. Heibel, Columbus; Raymond R. Savarda, Centerburg, both of Ohio

[73] Assignee: Allegro Microsystems, Inc., Atherton, Calif.

[21] Appl. No.: 415,133

[22] Filed: Sep. 29, 1989

[51] Int. Cl.$^5$ ..................... G06F 13/38; G06F 15/16
[52] U.S. Cl. ................... 364/200; 364/228; 364/240; 364/242.94; 364/284; 364/260; 370/60
[58] Field of Search ... 364/200 MS File, 900 MS File; 340/711, 717, 720, 825.06, 825.07; 370/60, 60.1, 94.1

[56] References Cited

U.S. PATENT DOCUMENTS

| | | | |
|---|---|---|---|
| 4,490,785 | 12/1984 | Streck et al. | 364/200 |
| 4,665,501 | 5/1987 | Saldin et al. | 364/900 |
| 4,720,784 | 1/1988 | Radhakrishnan et al. | 364/200 |
| 4,731,750 | 3/1988 | Hoflieh et al. | 364/900 |
| 4,787,025 | 11/1988 | Cheselka et al. | 364/200 |
| 4,837,704 | 6/1989 | Lengefeld | 364/478 |
| 4,866,664 | 9/1989 | Burkhardt, Jr. et al. | 364/900 |
| 4,949,254 | 8/1990 | Shorter | 364/200 |
| 4,951,245 | 8/1990 | Bailey et al. | 364/900 |
| 4,953,162 | 8/1990 | Lyons et al. | 370/94.1 |
| 4,958,341 | 9/1990 | Hemmady et al. | 370/60.1 |
| 4,977,556 | 12/1990 | Noguchi | 370/60 |

Primary Examiner—Michael R. Fleming
Assistant Examiner—Gopal C. Ray
Attorney, Agent, or Firm—Flehr, Hohbach, Test, Albritton & Herbert

[57] ABSTRACT

A multistation computer system includes a host computer and a plurality of workstations coupled to the host computer by a communications bus. The host computer is coupled to the communications bus by a host controller and each workstation is coupled to the communications bus by a workstation controller. When the host computer performs a data transaction with a workstation, the host controller monitors the bus signals on the host computer and determines which workstation is being addressed. The host's bus signals are then encoded and sent to the appropriate workstation in a data packet transmitted over the communications bus. In the preferred embodiment the encoded bus signals are transmitted over an optical fiber bus which is daisy chained to all the workstation in the computer system and then back to the host computer. At the workstation the encoded bus signals are decoded and then asserted on the workstation's bus. Signals sent by the workstation back to the host computer go through a similar encoding, transmission and decoding process. The system thereby mimics the operation of a workstation which is directly coupled to the internal bus of the host computer. Memory or data transfers from the host to any workstation are immediately acknowledged by the apparatus of the present invention, even though the data has not yet been received by the workstation. This allows the host to immediately move on to its next task without having to wait for the workstation to process the previous data transfer.

11 Claims, 16 Drawing Sheets

EXTENDED MULTISTATION BUS SYSTEM AND METHOD

The present invention relates generally to multistation computer systems and particularly to methods and systems for interconnecting several work stations to a host computer.

BACKGROUND OF THE INVENTION

Multistation computer systems are widely used because of the economies associated with using a single powerful processor to service the computation needs of a group of users. There are a vast number of such products, using a large number of different computer architectures. The present invention concerns one aspect of such computer architectures: the interconnections between the host computer and its workstations.

There are two primary classes of methods which are used to interconnect host computers to their workstations. First, there is the direct connection method in which each workstation is coupled by a cable to a port on the host computer. In this model, the host computer interacts with the workstation as it would with any other peripheral device. As a result, the length of the cable to the workstation is quite limited because of the need to limit the amount of time that the processor in the host computer can be forced to wait to execute standard transactions such as writing a byte or word of data in a workstation's video memory. Typical cable length restrictions range from 20 to 200 meters. The longer the cable to a workstation, the greater the impact that workstation has on the overall performance of the computer system. An advantage of this type of multistation computer system is that the workstations need not have any internal computational capability, allowing the use of relatively inexpensive workstations.

Second, there are multistation computer systems in which the host computer interacts with its workstations via a local area network. Local area networks (LANs) allow the workstations to be daisy chained together, thereby reducing the number of peripheral devices which are directly connected to the host computer. However, LANs requires a level of network software which significantly reduces the performance of the computer system and noticeably slows down the speed with which the host computer services the workstations. In addition, this type of multistation computer system requires the use of relatively expensive workstations which have their own CPUs because it is impractical to have a host computer service directly service hardware interrupts in workstations coupled to the host computer by a local area network.

SUMMARY OF THE INVENTION

The present invention is a multistation computer system that includes a host computer and a plurality of workstations coupled to the host computer by a communications bus. The host computer is coupled to the communications bus by a host controller and each workstation is coupled to the communications bus by a workstation controller. When the host computer performs a data transaction with a workstation, the host controller monitors the bus signals on the host computer and determines which workstation is being addressed. The host's bus signals are then encoded and sent to the appropriate workstation as a data packet. In the preferred embodiment the encoded bus signals are transmitted over an optical fiber bus which is daisy chained to all the workstations in the computer system and then back to the host computer. When a workstation controller receives a data packet, the encoded bus signals in the packet are decoded and then asserted on the workstation's bus. Signals sent by the workstation back to the host computer go through a similar encoding, transmission and decoding process. From another perspective, the host controller and workstation controllers together form a hardwired connection between the host computer and the workstations for transmitting the host's bus signals to the internal busses of the workstations. Thus, the present invention mimics the operation of a workstation which is directly coupled to the internal bus of the host computer.

The present invention can be viewed as a hybrid of the first and second types of computer architectures described above. The present invention combines the advantages of both of the above described prior art architectures and avoids most of their disadvantages.

An important feature of the present invention is that the computer system can use relatively inexpensive workstations with no internal computational capability even though the workstations are indirectly coupled to the host computer. In addition, data transfers from the host to any workstation are immediately acknowledged by the host controller of the present invention, even though the data has not yet been received by the workstation. The workstation processes the data transfer whenever the encoded signals reach it. In this way, the host is able to immediately move onto its next task without having to wait for the workstation to process the previous data transfer. Thus the present invention actually improves the performance of the host computer and reduces the load imposed on the host by each workstation in the system.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
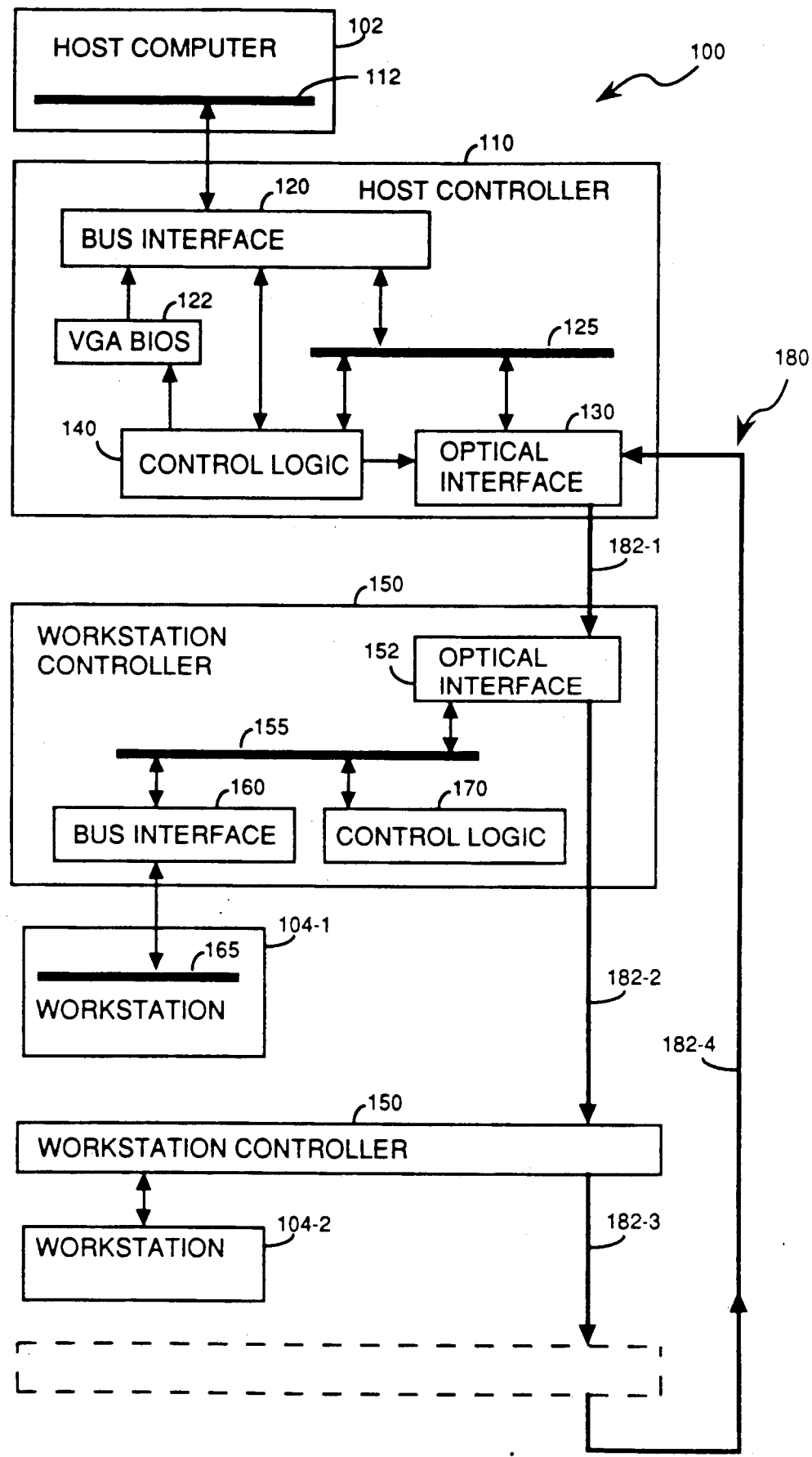
FIG. 1 is a block diagram of a multistation computer system in the preferred embodiment of the present invention.

Referring to FIG. 1, there is shown a multistation computer system 100 having a host computer 102 that is coupled to a number of workstations 104. In the preferred embodiment, the host computer is an IBM PC/AT compatible computer running a multiuser operating system, such as the UNIX (a trademark of AT&T) operating system. However, it should be understood that the present invention can be used with virtually any host computer running a multiuser operating system.

A host controller 110 is coupled to the system bus 112 of the host computer 102. More specifically, the host controller 110 monitors the host's system bus 112 for signals corresponding to data transfers between the host 102 and any of the workstations. Typical data transfers (also herein called data transactions) include writing data into the video memory of a workstation, sending data to any specified port of a workstation, and polling the interrupt status of one or all of the workstations. Other data transactions include reading data stored in the video memory of a workstation and responding to an interrupt sequence initiated by one of the workstations.

As will be described in much more detail below, the host controller 110 includes a bus interface 120 coupled to the system bus 112 of the host computer, a VGA BIOS 122, which is a read only memory (ROM), an internal bus 125, an optical interface 130 and control logic 140. The control logic 140 in the preferred embodiment comprises two state machines which run at a clock rate that is twice the clock rate of the host computer 102 and which control the sequence of operations required for implementing each data transfer that is initiated by either the host computer 102 or one of the workstations 104.

Whenever the host computer 102 generates bus signals on its bus 112 corresponding to a data transfer operation, the host controller 110 generates a data packet which denotes or represents the data transfer. Thus each data packet generated by the host controller 110 denotes which one of said workstations is being addressed, and a command which specifies the type of data transfer being performed. If the data transfer is a memory write operation, the data packet will include the memory address to which data is being written, and the data value(s) to be stored in the workstation's memory. If the data transfer is a memory read operation, the data packet will include the memory address to which data is to be read from the workstation's memory. The host controller 110 can also send a data packet which causes all the workstation controllers to preform an internal reset operation.

Each workstation 104 is coupled to a workstation controller 150 which has a communications interface 152 (an optical fiber interface in the preferred embodiment) for receiving data packets generated by the host controller 110. The workstation controller 150 also has an internal bus 155 and a bus interface 160 which couples the workstation controller 150 to the system bus (i.e., address, data and control busses) 165 in the corresponding workstation 104. The control logic 170 in the workstation controller includes a state machine which controls the sequence of operations required for implementing each data transfer to and from the workstation 104. Each workstation controller's control logic 170 also handles the forwarding of data packets not addressed to the workstation 104 which coupled to that workstation controller 150. There are two such types of packets: packets being sent by the host 102 to other workstations 104, and data packets being sent by other workstations 104 to the host computer 102.

As will be explained in more detail below, when the workstation controller 150 receives a data packet addressed to its workstation, it generates signals on the address bus, data bus and control bus of the workstation 104 which correspond to the address bus, data bus and control bus signals in the host computer monitored that were represented by the received data packet. Thus, the host controller 110 and workstation controller 150 work together to regenerate the host's bus signals on the bus of the appropriate remotely located workstation 104, and to regenerate workstation bus signals on the bus of the host computer 102.

The host computer 102 and workstations 104 are interconnected by a communications bus or network 180, which in the preferred embodiment is optical fiber network or loop. This communications network 180 is formed by a daisy chain of optical fiber links 182-1, 182-2, 182-3, etc., which together form an optical fiber loop that traverses the entire computer system. Each data packet is transmitted by the outgoing optical link 182 of the transmitting controller 110 or 150. The packet is then received and forwarded by each system component until it reaches its destination.

The use of an optical fiber network 180 and the data packet scheme briefly described above has several advantages. First, the distance between the host computer 102 and the workstations 104 can be quite large. Distances of up to ten kilometers can be accommodated without difficulty and without significant impact on the operation of the host computer 102. Second, as will be explained in more detail below, all data transfers from the host to a workstation are immediately acknowledged, even though the data may not arrive at the specified workstation for several microseconds, thereby freeing the host to execute subsequent operations.

While data reading operations will be impacted by the length of the optical loop 180, most data transfers between a host computer 102 and its workstations 104 are data writing operations. Furthermore, a data writing operation to a standard VGA memory in a workstation will typically take four microseconds, during which time the host computer 102 cannot do any other work. Using the present invention, data writing operations are completed in no longer than eight hundred nanoseconds (0.8 microseconds). Therefore use of the present, even with workstations remotely located from the host computer, can actually improve the performance of a multistation computer system.

Figure 2:
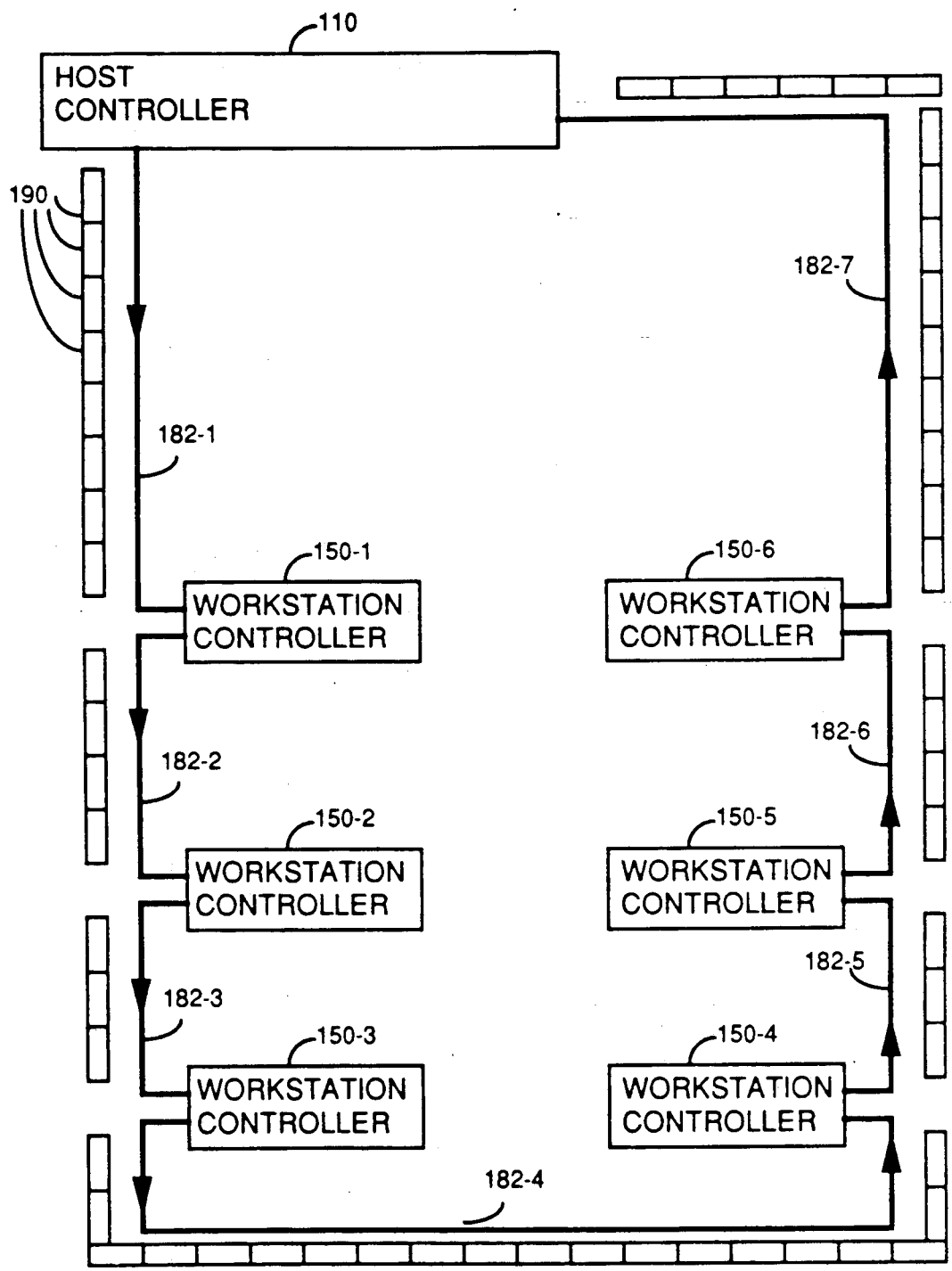
FIG. 2 is a conceptual diagram of the method by which data is transmitted through the optical fiber network in the preferred embodiment.

Referring to FIG. 2, there is shown a conceptual diagram of the optical fiber links 182-1 to 182-7 which interconnect the host controller 110 and the workstation controllers 150-1 to 150-6 in an exemplary multistation computer system. The "boxcars" 190 alongside the optical links each represent a ten-bit "chunk" or byte of data that is being transmitted along the optical fiber network. Every 100 nanoseconds, each of the host and workstation controllers "fills" one boxcar by transmitting one byte of data. That byte of data may be a byte that is being forwarded to another controller further along the optical network, or it may be a byte generated by the transmitting controller. If there is no data to be transmitted, the boxcar if filled with a "synchronization byte", which is essentially a space filler. Synchronization bytes are used only to keep the transmitters and receivers along the network synchronized.

The following is a general description of the method by which data is transmitted through the optical fiber network 180 in the preferred embodiment. Each byte (i.e., eight bits) of data is encoded and transmitted over the optical network as a ten-bit "chunk" of data. The additional two bits in each boxcar 190, herein called the tag bits, are used to identify the source and purpose of the data. For all intents and purposes, each ten-bit chunk of data on the optical network is equivalent to an eight bit byte inside the host computer or workstation, and these ten-bit chunks of data will also be called "bytes". The user or ordinary skill in the art will understand that when reference is made to a byte of transmitted data, such "bytes" shall mean a ten-bit chunk comprising eight bits of data and two tag bits.

Data is transmitted in ten-bit "bytes" over each optical fiber link 182 at a rate of 100 megabits per second. Thus ten-bit "bytes" are transmitted over the network at a rate of 10 MHz (i.e., one ten-bit byte is transmitted every 100 nanoseconds). As each boxcar 190 is received by a controller, such as workstation controller 150-2, it is inspected by the controller to determine how the data in that boxcar should be handled. Data addressed to any controller other than the receiving controller is retransmitted in a new boxcar, usually with a 100 nanosecond delay for inspecting the data in the boxcar. It should be noted, however, that each controller contains a FIFO (first in first out) buffer which enables the controller to delay the processing of received data for a short period of time while it is busy completing a previously initiated data transaction. Only non-empty box cars are loaded into the FIFO. When empty box cars (i.e., synchronization bytes) are received, no data is loaded into the FIFO and the controller can then "catch up" with its backlog of accumulated boxcars by processing the data stored in the FIFO. In the normal course of events, a large majority of the boxcars in any system will contain synchronization bytes. Since synchronization bytes do not require processing, the controller can process backlogged data without accumulating a new backlog while receiving synchronization bytes, and in this way will catch up with its backlog.

WORKSTATION CONTROLLER

While the host controller 100 is clearly the system component which initiates most data transfers, it is easier to explain the operation of the present invention by first reviewing the operation of the workstation controller 150.

Figure 3:
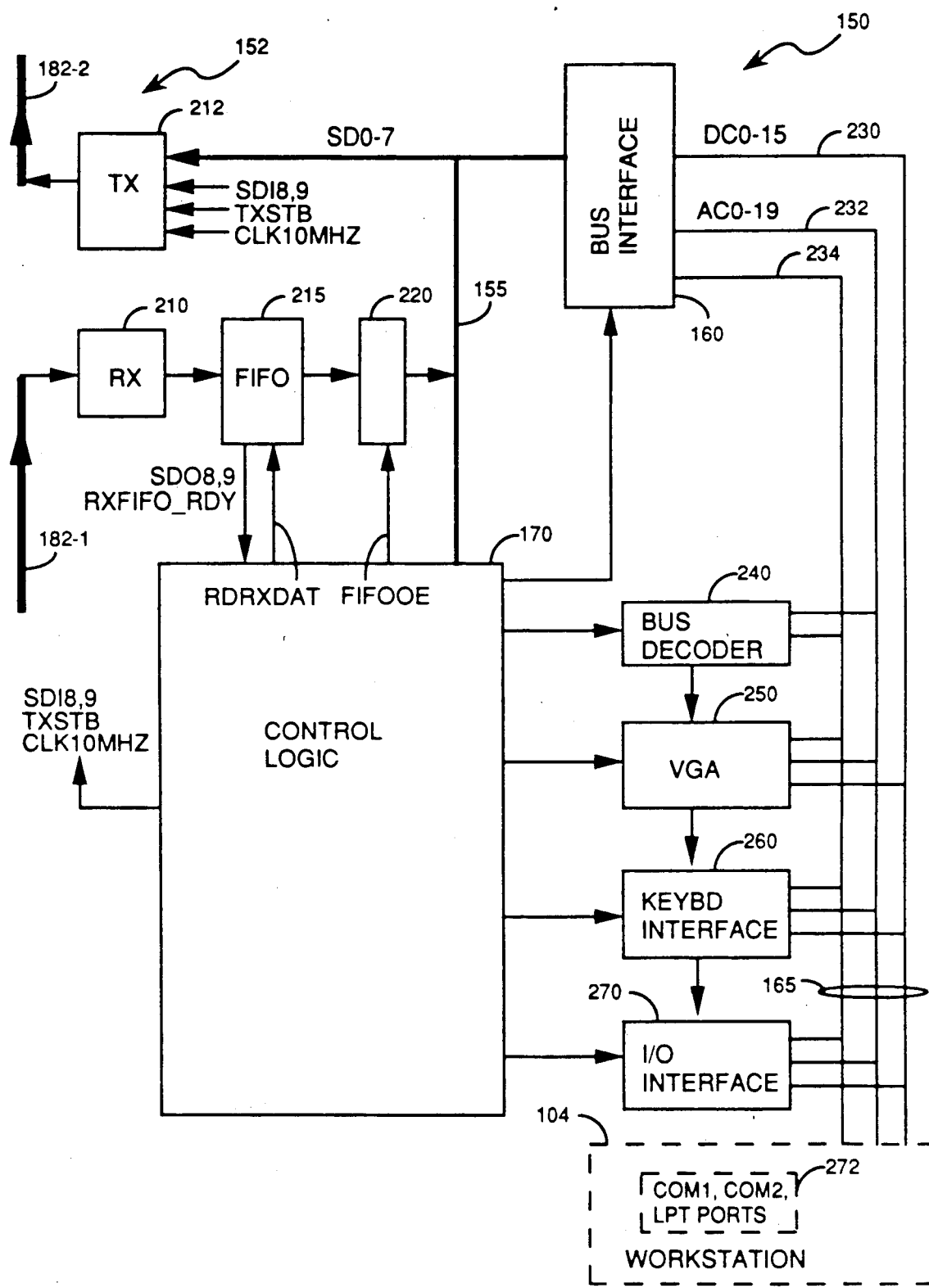
FIG. 3 is a block diagram of a workstation controller in the preferred embodiment of the present invention.

Referring to FIG. 3, the primary components of each optical workstation controller 150 are as follows. The optical interface 152 comprises a receiver 210 and a transmitter 212. In the preferred embodiment the receiver and transmitter are standard TAXI chips, manufactured by Advanced Micro Devices, coupled to standard optical signal receiving and transmitting c its.

The ten bit bytes received from the receiver 210 are initially strobed into a FIFO buffer 215 using a strobe signal generated by the receiving TAXI circuit 210. In the preferred embodiment, the FIFO buffer 215 is a four "byte" (i.e., four by ten bit) first-in-first-out register. In an alternate embodiment, the Cyprus 7C409 64 byte CMOS FIFO is used. The FIFO's control circuitry sends a signal called RXFIFO_RDY to the control logic 170 to indicate that at least one byte of unprocessed data is stored in the FIFO buffer 215. The stored data in the FIFO is clocked out by the RDRXDAT signal generated by the control logic 170. Eight bits of the data signals output by the FIFO 215 are asserted on the eight bit internal bus 155 by buffer 220 when the signal FIFOOE is enabled by the control logic 170. The eight signals on the bus are labelled SD0 through SD7. The two tag bits from each byte of data output by the FIFO 215, labelled SDO8 and SDO9, are processed directly by the control logic 170.

The two tag bits SDO8 and SDO9 are used as follows. SD09 is set to a value of "0" for all the data bytes in data packets that are generated by the host controller, and is set to a value of "1" for all data bytes in data packets that are generated on one of the workstation controllers. SDO8 is set to a value of "1" for the first byte, herein called the header, of each data packet, and is set equal to "0" for all other bytes. This same scheme is used when the workstation controller generates and transmits new data packets, except that the tag bits are then labelled SDI8 and SDI9.

The transmitter 212 generates a distinct synchronization byte value, not related to the values of SDO8-9 or SDI8-9, when the signal TXSTB is not generated, which indicates that the workstation controller does not have data to transmit. The receivers in the host and workstation controllers detect these synchronization bytes and treat them as null data that is not loaded into the FIFO buffers in these controllers.

It should be noted that, with a very few exceptions, all signals and signal names have been converted for the purposes of this description into positive logic signals so as to simplify the explanation of the present invention. As will be understood by those skilled in the art, certain signals, such as output enable signals, are traditionally negative logic signals (i.e., enabled when low). As will also be understood by those skilled in the art, it is a simple matter to invert any logical or boolean signal, as may be required when using signals in conjunction with commercially available circuits that require certain input signals to be either positive or negative logic signals.

Bus interface 160 couples the internal bus 155 to the workstation bus 165 which includes a data bus 230 carrying signals DC0 through DC15, address bus 232 carrying signals AC0 through AC19, and control signal bus 234 which carries a number of signals described below. Signals from the control logic 170 control the flow of data between the internal bus 155 and the workstation busses 230, 232 and 234.

Bus decoder 240 both decodes and generates signals on the control bus 234. As will described in more detail below with reference to FIG. 6, the bus decoder includes a small state machine which controls the generation of memory and I/O (i.e., input and output) read and write control signals on the control bus 234.

The VGA interface 250 is a standard VGA video controller made from commercially available circuits. The keyboard interface 260 is also a standard interface circuit for receiving keystrokes entered at a keyboard. Finally, the I/O interface 270 is a commercially available circuit that handles standard input and output transactions through the serial (COM1, COM2) and parallel (LPT) ports 272 of the workstation 104.

Workstation State Machine

To describe the detailed operation of the workstation controller, we will first describe the state machine used in the control logic 170 which is used to control the various data transactions that can occur in the preferred embodiment. Then we will describe the hardware in the bus interface 160, bus decoder 240, and control logic 170 in detail.

Figure 4:
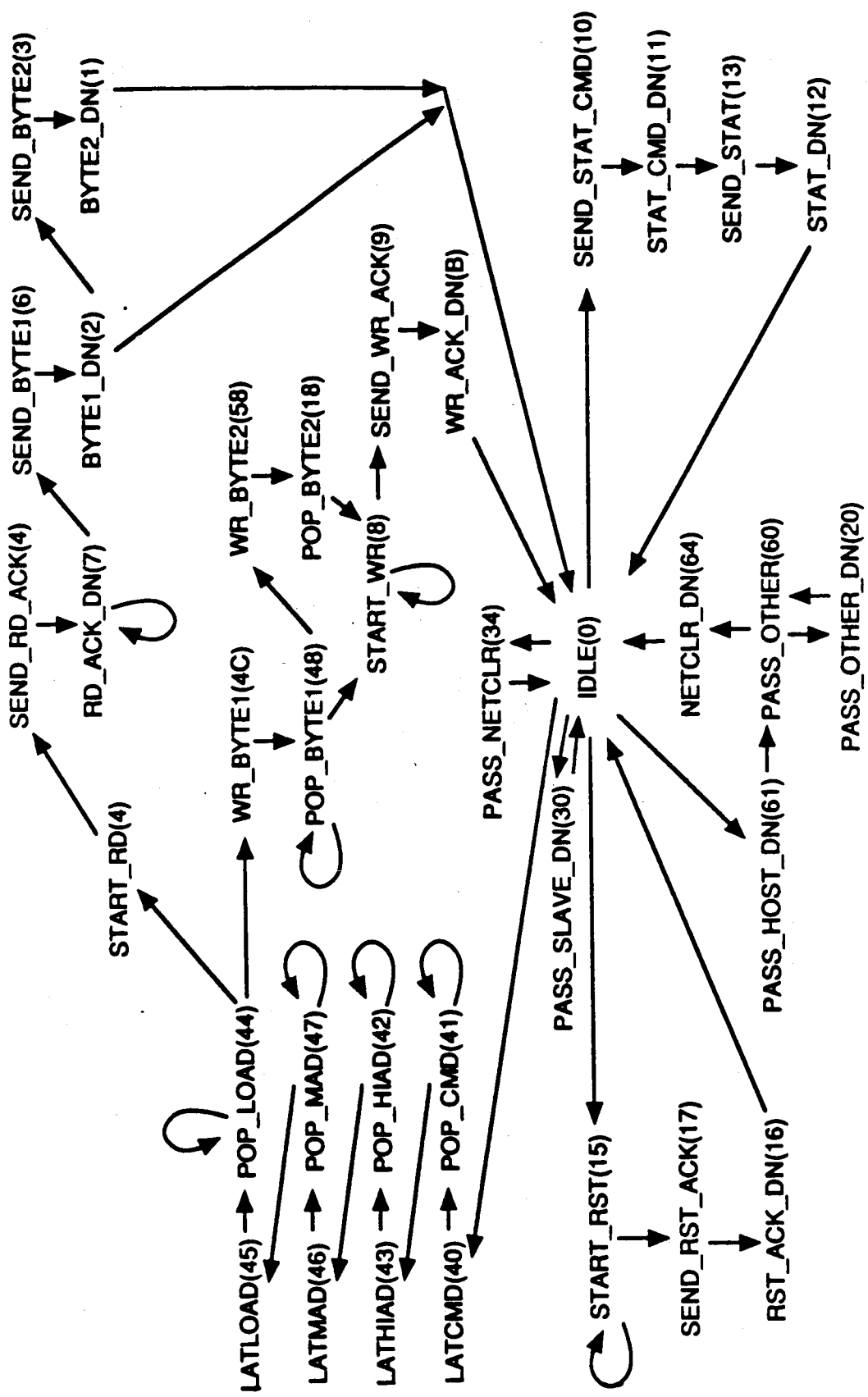
FIG. 4 depicts a state diagram of the operation of the workstation controller shown in FIG. 3.

Referring to FIG. 4, there is shown a state machine flow diagram in which each logical state has both a name and a numerical state value shown in parentheses. Note that the numerical values for states are denoted in hexadecimal format (base sixteen).

Table 1 contains a list of the logical states for the workstation's state machine along with a brief description of the purpose or function of each state. Appendix 1 contains a pseudocode program which denotes the conditions required to move from each logical state to another logical state. As will be understood by those skilled in the art, this pseudocode program is equivalent to the specification provided to commercially available software for implementing a state machine in a programmed logic array. When combined with the PLA equations in Tables 2, 3, 4 and 5, Appendix 1 provides a complete description of the circuitry for the state machine used in the preferred embodiment of the workstation controller 150.

Note that in the PLA equations listed in the Tables in this document, and in the Appendices the standard boolean operators are denoted as follows: the boolean function OR is denoted by a pound sign (#), the boolean function AND is denoted by an ampersand (&), and the boolean function NOT is denoted by an exclamation point (!). Unless otherwise specified by parentheses, in compound boolean equations listed in this document the three boolean functions are prioritized so that the order of computation is (1) first execute all NOT functions, (2) then execute all AND functions, and (3) finally execute all OR functions.

To understand the state transition diagram in FIG. 4, one must understand that the state machine operates on a clock cycle that is twice the rate at which data bytes are received from the optical network. Thus, since data bytes are received at a rate of 10 MHz in the preferred embodiment, the workstation controller 150 uses a clock rate of 20 MHz.

Using a 20 MHz clock rate, the state machine has two clock cycles for handling each date byte received: a first clock cycle for decoding the data, and a second cycle for processing or retransmitting the data and signals derived therefrom, as required. When no data transactions are being handled, the state machine remains in the IDLE state, waiting for the next data transaction.

The first byte of each data packet received always contains two four bit values: a workstation identifier, and a command code, as well as a two bit tag. Some data packets contain only this first byte, while others have several additional bytes of information. The end of each data packet received from the host controller, regardless of its length, is followed by a NETCLR command—which occupies a single byte.

Table 2 contains a list of the sixteen types of commands that can be sent from the host controller to a workstation controller.

Pass Along Commands For Other Workstations

If the workstation identifier corresponds to a host generated data packet that is for another workstation, then the state machine first enters the PASS_HOST_DN state. While in the PASS_HOST_DN state, the signal TXSTB is generated, which causes the transmitter 212 to retransmit the header of the received data packet. Next, the state machine goes to the PASS_OTHER state, during which time the received command is forwarded by retransmitting it onto the optical network through the transmitter 212.

As mentioned above, every host generated data packet is followed by a "NETCLR" command. The NETCLR command is encoded as a single byte data packet. If the next byte received is a NETCLR command, then the state machine enters the NETCLR_DN state. In this state the NETCLR command is retransmitted on the optical network, and then the state machine returns to the IDLE state.

If the data packet has more than one byte in it, however, the state machine goes into the PASS_OTHER_DN state for retransmitting the next byte, and then returns to the PASS_OTHER state for decoding the next byte received. The state machine continues to cycle back and forth between the PASS_OTHER_DN and PASS_OTHER states until a NETCLR command is received, marking the end of the data packet.

Pass Along Data From Other Workstations

When a data packet generated by another workstation is received, as denoted by the tag bits on each of the bytes in that data packet, the state machine enters the PASS_SLAVE_DN state in which it merely retransmits the received data. The state machine then returns to the IDLE state.

Pass Along NETCLR Commands

If a NETCLR command is received when the state machine is in the IDLE state, the state machine enters the PASS_NETCLR state in which it merely retransmits the received data. The state machine then returns to the IDLE state.

Handling RESET Command from Host

When a reset command is received from the host controller, the state machine goes to the START_RST state, which causes the control logic to generate an internal RESET signal. This signal causes certain circuits in the workstation controller to be reset. After the RESET signal is generated, the state machine goes to the SEND_RST_ACK state in which it generates a new reset command (i.e., data packet) to be sent to the next component on the communications bus 180. This reset data packet is transmitted during the RST_ACK_DN state, and then the state machine returns to the IDLE state.

Send Status to Host

Status information is sent to the host controller only when a change in the workstation's interrupt signals is detected. The workstation controller's bus interface 160 generates an signal called INTCHNG whenever the workstation 104 generates an interrupt signal. When this happens, the workstation controller's state machine responds by first going into the SEND_STAT_CMD state, during which it generates a packet header which includes the identity of the workstation and a four-bit command value that identifies as an interrupt status information packet. This header is transmitted while the state machine is in the STAT_CMD_DN state. Then the state machine goes to the SEND_STAT state, in which the status of the workstation's interrupt signals is loaded onto the internal bus 155, and then to the STAT_DN state in which this data is transmitted onto the optical network.

Memory and I/O Read and Write Commands from Host

The most important and complicated data transaction handled by the workstation controller is the receipt and processing of read and write commands, which can be used for reading or writing data to or from either the workstation's video (VGA) memory or an I/O port. When the first byte of the data packet is received and decoded, the state machine enters the LATCMD state. Then the state machine goes to the POP_CMD sate in which this byte is "popped" off the FIFO—meaning that the FIFO is clocked so as to allow the next byte of data in the FIFO to be processed. This is similar to popping data off a stack in a conventional computer system.

All read and write commands are followed by three bytes of address information. As each byte of address information is received it is processed while the state machine progresses through a pair of two states. Note, however, that one or more synchronization bytes may occur between any two bytes in a data packet. Therefore the state machine may remain in second state (e.g., the POP_CMD state) associated with each byte until the next byte of the packet is received.

The LATHIAD state is used to receive the highest order byte of address data and to load it into a latch in the bus interface 160. Then the state machine goes to the POP_HIAD state in which the high address is popped off the FIFO. The LATMAD state is used to receive the middle byte of address data and to load it into a latch in the bus interface 160. Then the state machine goes to the POP_MAD state in which the middle address byte is popped off the FIFO. Finally, the LATLOAD state is used to receive the lowest order byte of address data and to load it into a latch in the bus interface 160. Then the state machine goes to the POP_LOAD state in which the lowest order address byte is popped off the FIFO.

The next action by the state machine depends on whether a read or write command is being executed. If a read command is being executed, the state machine goes first to the START_RD state in which it generates a one byte "header" for a data packet. This data packet header, which includes a four bit value that identifies the workstation controller sending the data packet, is transmitted while the state machine goes to the RD_ACK_DN state.

The state machine then remains in the RD_ACK_DN state until the data at the address previously loaded into the bus interface 160 has been read, which may require the state machine to wait for one to three state machine cycles.

Referring to Table 2, it should be noted that the command received from the host may require the workstation to send it either the low byte, the high byte or both bytes read at the specified address. Therefore, after transmitting the data packet's header, the workstation controller will transmit either one or two bytes, depending on what command is being executed.

In the state SEND_BYTE1 the workstation controller puts the first byte of data to be transmitted onto the bus 155, and then transmits it while in the BYTE1_DN state. If a second byte of data is to be sent, that is done in the SEND_BYTE2 and BYTE2_DN states. Then the state machine goes back to the IDLE state.

If a write command is being executed, the state machine goes first to the WRITE_BYTE1 state in which the first byte of data in the received packet is loaded into a latch in the bus interface 160. Then that byte of data is popped off the FIFO in the POP_BYTE1 state. If the received data packet contains a second byte of data to be written, the state machine goes to the WRITE_BYTE2 state and the second byte of data is loaded into a latch in the bus interface 160. The second byte of data is then popped off the FIFO in the POP_BYTE2 state.

Next, the state machine moves to the START_WR state, which causes the control logic to generate the appropriate write control signals for writing the data loaded into the bus interface to the specified address. Whenever the write operation is completed, the state machine goes to the SEND_WR_ACK state, in which it generates a one byte packet that tells the host controller 110 that the write operation was successfully completed. This data packet is sent while the state controller is in the WR_ACK_DN state, and then the state machine goes back to the IDLE state.

TABLE 1

| WORKSTATION CONTROLLER'S LOGICAL STATES | | |
|---|---|---|
| STATE NAME | VALUE | DESCRIPTION |
| IDLE | 00 | WAIT for next Transaction |
| PASS_NETCLR | 34 | Receive and retransmit NETCLR command. Marks end of data being sent host controller. |
| PASS_SLAVE_DN | 30 | Retransmit data packets generated by other workstation. |
| PASS_HOST_DN | 61 | Command for other workstation received. |
| PASS_OTHER | 60 | Retransmit one byte of data packet. |
| PASS_OTHER_DN | 20 | Receive next byte of data packet. |
| NETCLR_DN | 64 | Retransmit NETCLR message. |
| SEND_STAT_CMD | 10 | Generate header for status information packet. |
| STAT_CMD_DN | 11 | Send status header to host. |
| SEND_STAT | 13 | Generate status info portion of status info packet. |
| STAT_DN | 12 | Send status info portion of status info packet to host. |

TABLE 1-continued
WORKSTATION CONTROLLER'S LOGICAL STATES

| STATE NAME | VALUE | DESCRIPTION |
| --- | --- | --- |
| START_RST | 15 | Reset command received. This triggers a hardware reset signal in the slave. |
| SEND_RST_ACK | 17 | Generate reset ack message. |
| RST_ACK_2 | 16 | Send reset ack message to host. |
| LATCMD | 40 | Data received from Host for this workstation. |
| POP_CMD | 41 | Pop the byte off the FIFO. |
| LATHIAD | 43 | Latch in high address byte. |
| POP_HIAD | 42 | Pop the byte off the FIFO. |
| LATMAD | 46 | Latch in middle address byte. |
| POP_MAD | 47 | Pop the byte off the FIFO. |
| LATLOAD | 45 | Latch in low address byte. |
| POP_HIAD | 44 | Pop the byte off the FIFO. |
| START_RD | 04 | Go here if read command. If I/O, select I/O port to start read. |
| SEND_RD_ACK | 05 | Send read ack message to host controller. |
| RD_ACK_DN | 07 | Wait for requested information to be access. Send sync bytes in the mean time. |
| SEND_BYTE1 | 06 | Set up and send first byte of requested info. |
| BYTE1_DN | 02 | Continue to send first byte of requested info. Go to IDLE if only one byte was requested. |
| SEND_BYTE2 | 03 | Send second byte of requested info. |
| BYTE2_DN | 01 | Continue to send second byte of requested info. |
| WR_BYTE1 | 4C | Go here if write command. Load first byte of data into latch in the slave controller's bus interface. |
| POP_BYTE1 | 48 | Pop byte from FIFO. If single byte write, go to START_WR. If not, wait for second byte of data. |
| WR_BYTE2 | 58 | Load second byte of data into latch. |
| POP_BYTE2 | 18 | Pop byte from FIFO. |
| START_WR | 08 | Generate write cycle in the slave workstation. Wait until write cycle finishes, signalled by a bus ready. |
| SEND_WR_ACK | 09 | Send ack message to host controller. |
| WR_ACK_DN | 0B | Continue to send ack message to host controller. |

TABLE 2
HOST COMMANDS TO WORKSTATION CONTROLLER

| ICMD | NAME | DESCRIPTION OF COMMAND |
| --- | --- | --- |
| 0000 | IORD_W | I/O Read Command With Acknowledge |
| 0001 | MEMR_W | Memory Read Command with acknowledge |
| 0010 | IOWR_W | I/O Write Command |
| 0011 | MEMW_W | Memory Write Command |
| 0100 | IORD_HB | I/O Read from High Byte at address |
| 0101 | IORD_LB | I/O Read from Low Byte at address |
| 0110 | MEMR_HB | Memory Read from High Byte at address |
| 0111 | MEMR_LB | Memory Read from High Byte at address |
| 1000 | IOWR_HB | I/O Write to High Byte at address |
| 1001 | IOWR_LB | I/O Write to Low Byte at address |
| 1010 | MEMW_HB | Memory Write to High Byte at address |
| 1011 | MEMW_LB | Memory Write to Low Byte at address |
| 1100 | RESET | Reset Workstation Controller |
| 1101 | STAT | Send Status Information /* not used */ |
| 1110 | NETCLR | Marker for end of data packet |
| 1111 | XTRA | Unused |

Bus Interface

Figure 5:
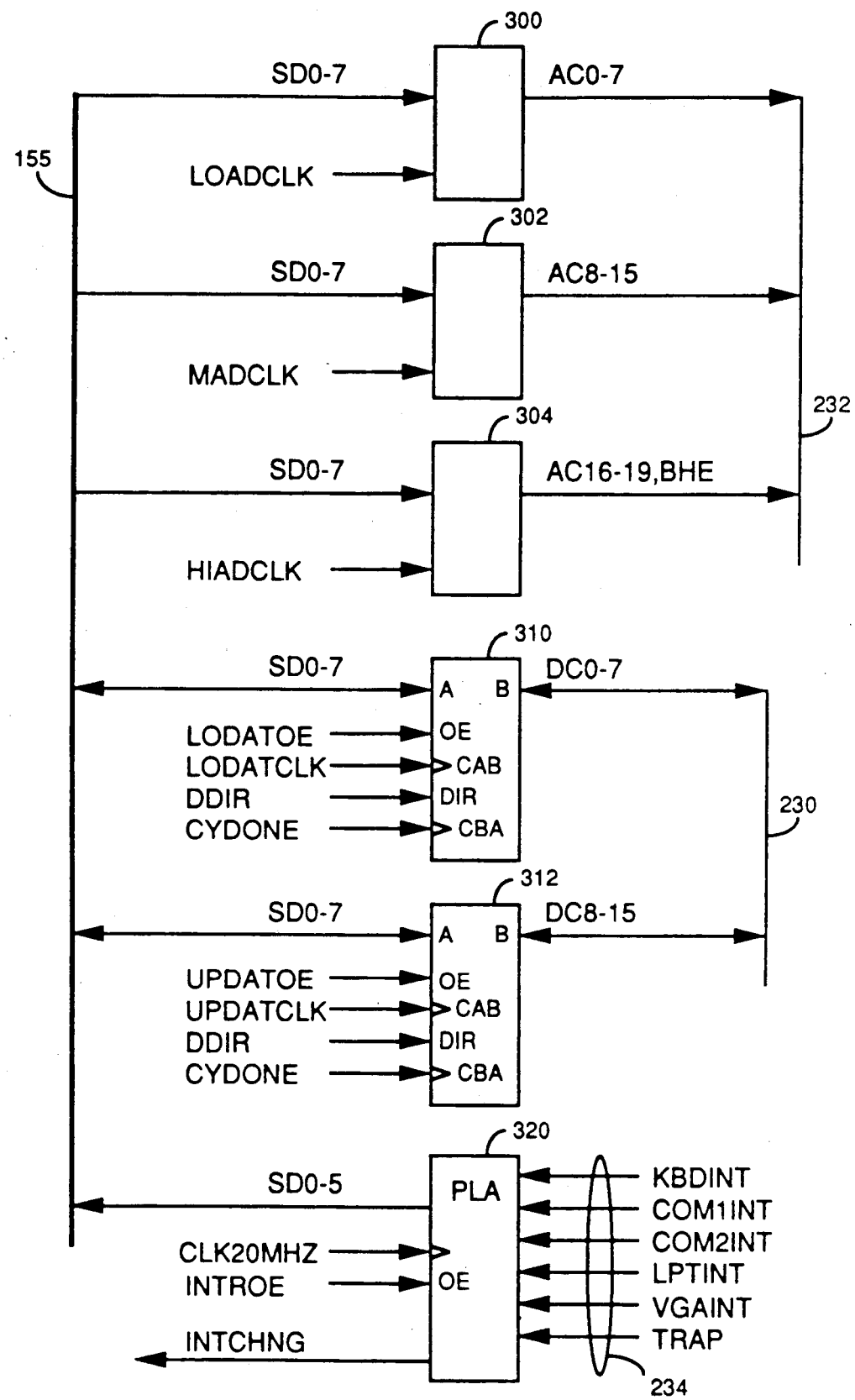
FIG. 5 is a block diagram of the bus interface in the workstation controller shown in FIG. 3.

Referring to FIG. 5, the bus interface 160 consists of three latches 300, 302, 304 for latching in the low, middle and high order address bytes used in read and write operations. The data on the internal bus 155 is latched into the low order address latch 300 by the LOADCLK signal. Similarly, the data on the internal bus 155 is latched into the middle order address latch 302 by the MADCLK signal and into the high order address latch 304 by the HIADCLK signal.

Two transceivers 310 and 312 are used for transferring data between the internal bus 155 and the upper and lower bytes of the workstation's data bus 230. In one direction the transceiver acts as a latch in which data is latched from the internal bus 155 and asserted onto the data bus 230. In the other direction, from the data bus 230 to the internal bus, the transceiver 310 acts as tristate buffer. The DDIR signal controls the direction of data flow through the transceiver 310. When DDIR is set for data flow from the internal bus 155 onto the workstation's data bus 230, the UPDATCLK signal is used to latch data from the internal bus 155 into latch 310 and the LODATOE signal is used to assert that data on the workstation's data bus 230.

When DDIR is set for data transfers from the data bus 230 to the internal bus 155, the CYDONE signal is used in read operations to read in the data on the DC0-7 lines of the data bus 230, which is asserted on the internal bus if LODATOE is enabled.

The operation of transceiver 312 is identical to that of transceiver 310, except that data is transferred between the internal bus 155 and the DC8-15 lines of the data bus, and signals UPDATCLK and UPDATOE are used in place of signals LODATCLK and LODATOE.

A programmed logic array (PLA) 320 is used to transfer the signals on the workstation's six interrupt status lines KBDINT, COM1INT, COM2INT, LPTINT, VGAINT and TRAP onto the internal bus 155. The values of the six signals are latched into the PLA 320 at every cycle of the 20 MHz clock CLK20MHz. The currently latched values are asserted on lines SD0 through SD5 of the bus 155 only when the signal INTROE is enabled. The PLA 320 also generates an enabled INTCHNG signal whenever the value of any of the interrupt signals changes. When a INTCHNG signal is generated, the control logic 170 responds by sending a interrupt status data packet to the host controller 110.

Bus Decoder

Figure 6:
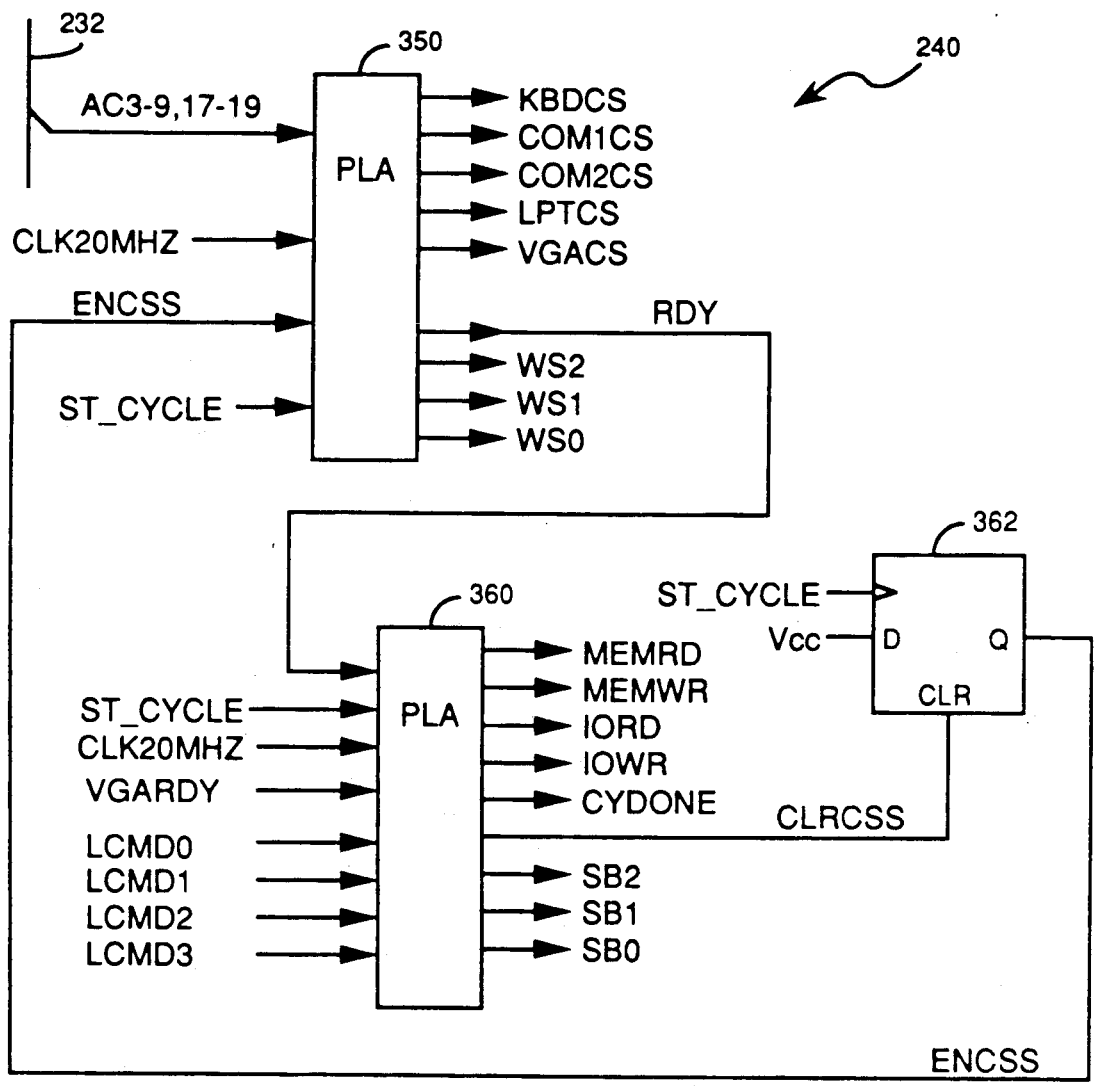
FIG. 6 is a block diagram of the bus decoder in the workstation controller shown in FIG. 3.

Referring to FIG. 6, the bus decoder 240 consists of two PLAs 350 and 360 and a flip-flop 362 which is used to generate signal ENCSS. The first PLA 350 generates the chip select signals KBDCS, COM1CS, COM2CS, LPTCS, and VGACS based on the address signals AC3-AC9 and AC17-AC19 on the workstation address bus 232, which indicate the resource in the workstation that is being addressed. The ENCSS signal input to PLA 350 acts as an "output enable" signal. That is, an enabled chip select signal can be output by PLA 350 only when ENCSS is enabled.

The ENCSS (enable chip select signal) input to the PLA 350 is generated by flip flop 362. In particular, ENCSS is enabled at the beginning of each memory or I/O operation by the ST_CYCLE signal. Note that the ST_CYCLE signal is generated by PLA 422, shown in FIG. 7, whenever the workstation's state machine enters the START_RD or START_WR states. When the memory or I/O operation is complete, the CLRCSS signal generated by PLA 360 clears flip flop 362 and thereby disables the ENCSS signal.

The PLA 350 also generates a delayed ready signal RDY after the chip select signals have been asserted. The amount of delay (e.g., 100 to 150 nanoseconds) depends on the workstation resource being addressed. The RDY signal is used by PLA 360 to control when the read/write control signals are generated.

Figure 7:
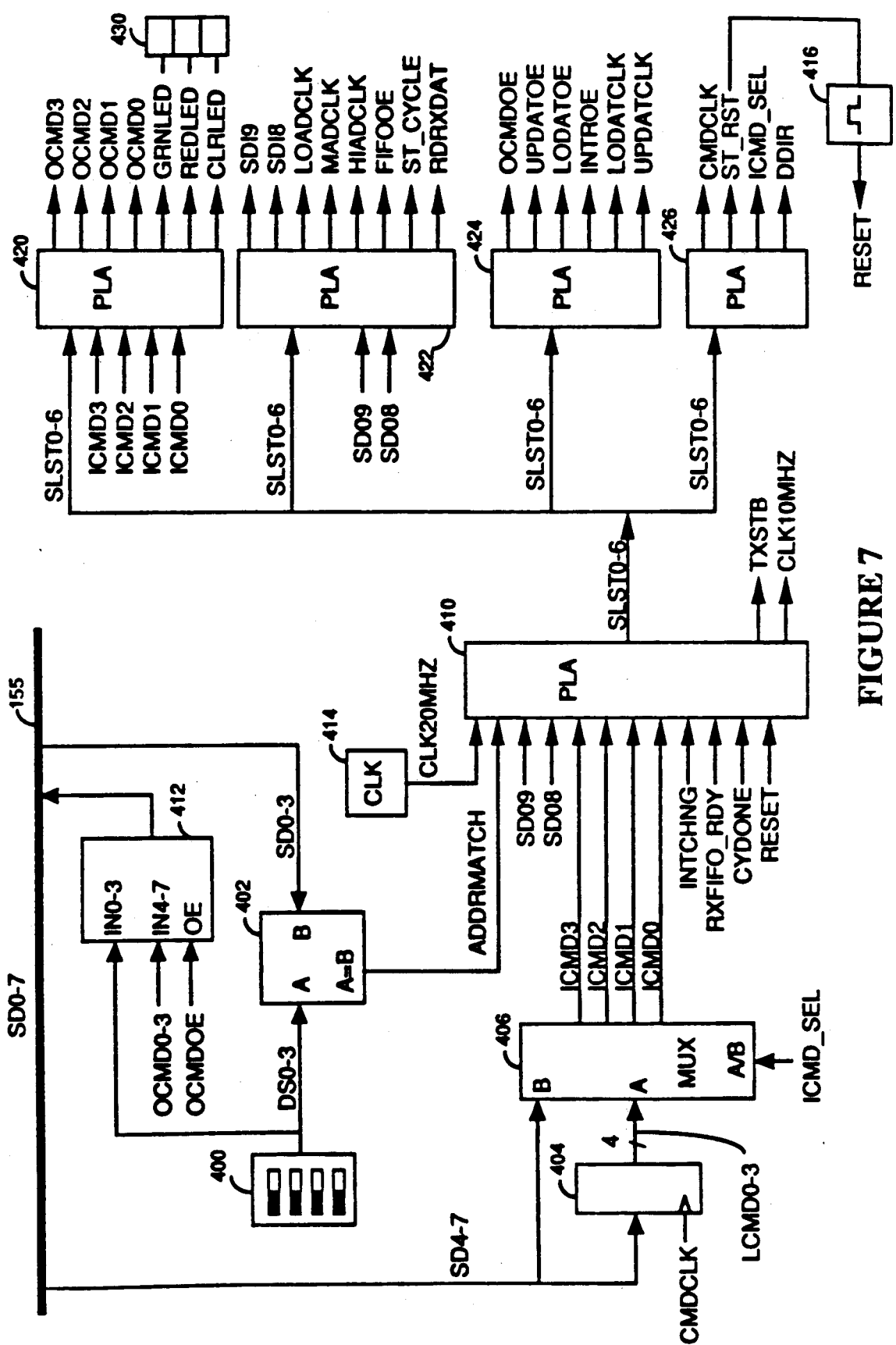
FIG. 7 is a block diagram of the control logic in the workstation controller shown in FIG. 3.

The second PLA 360 generates the read/write control signals MEMRD, MEMWR, IORD and IOWR used by the VGA memory and I/O ports of the workstation for enable memory and I/O operations. These signals are generated when the logical commands, as denoted by signals LCMD0-LCMD3, are received from the host controller. These logical commands are essentially the same as the input commands listed in Table 2. As can be seen in FIG. 7, LCMD and ICMD are equal when the multiplexer select signal ICMD_SEL is enabled.

The second PLA 360 incorporates a small state machine which controls the timing of the CLRCSS signal, and thereby controls the timing of memory and I/O data transfers. Appendix 2 contains a pseudocode program which denotes the conditions required to move from state to state in this state machine. Tables 3 and 4 list the PLA equations for PLAs 350 and 360, except for the state transistions denoted in Appendix 2.

TABLE 3

WORKSTATION CONTROLLER PLA EQUATIONS FOR PLA 350
/ Declarations and Intermediate Variable Definitions /

* WAIT STATES */
| STATE NAME | WAITSTATE (WS2, WS1, WS0) | |
|---|---|---|
| WAIT_IDLE | 000 | /* 'D'0 */ |
| WAIT_1 | 001 | /* 'D'1 */ |
| WAIT_2 | 011 | /* 'D'3 */ |
| WAIT_3 | 010 | /* 'D'2 */ |
| WAIT_4 | 110 | /* 'D'6 */ |
| WAIT_5 | 111 | /* 'D'7 */ |
| WAIT_6 | 101 | /* 'D'5 */ |
| WAIT_READY | 100 | /* 'D'4 */ |

VMEM_RNG = address1:[A0000..BFFFF]; /* 128K MEMORY */
VIO_RNG = address:[3B0..3DF];
XTRA_RNG = address:[210..21F];
XTRA1_RNG = address:[220..22F];
COM1_RNG = address:[3F8..3FF];
COM2_RNG = address:[2F8..2FF];
LPT_RNG = address:[378..37F];
KBD_RNG = address:[260..26F];
/ Logic Equations /
VGACS = (VMEM_RNG # VIO_RNG) & ENCSS;
COM1CS = COM1_RNG & ENCSS;
COM2CS = COM2_RNG & ENCSS;
LPTCS = LPT_RNG & ENCSS;
KBDCS = KBD_RNG & ENCSS;
/* COMMAND LENGTH (IORD,WR,MEMRD,WR)    */
/* IS 50NS + #W.S.*(50NS)    */
SEQUENCE waitstate {
    present WAIT_IDLE
        if ST_CYCLE & COM1_RNG
            next WAIT_5;
        if ST_CYCLE & COM2_RNG

TABLE 3-continued
WORKSTATION CONTROLLER PLA EQUATIONS FOR PLA 350
/ Declarations and Intermediate Variable Definitions /

```
        next WAIT_5;
     if ST_CYCLE & LPT_RNG
        next WAIT_5;
     if ST_CYCLE & KBD_RNG
        next WAIT_4;
     default
        next WAIT_IDLE;
  present WAIT_1        /* 6 WAIT STATE (300NS) UNTIL READY */
     next WAIT_2;
  present WAIT_2        /* 5 WAIT STATE (250NS) UNTIL READY */
     next WAIT_3;
  present WAIT_3        /* 4 WAIT STATE (200NS) UNTIL READY */
     next WAIT_4;
  present WAIT_4        /* 3 WAIT STATE (150NS) UNTIL READY */
     next WAIT_5;
  present WAIT_5        /* 2 WAIT STATE (100NS) UNTIL READY */
     next WAIT_6;
  present WAIT_6        /* 1 WAIT STATE (50NS) UNTIL READY */
     next WAIT_READY;
  present WAIT_READY    /* HERE WE OUTPUT A READY */
     next WAIT_IDLE;
}
RDY = waitstate:WAIT_READY;
```

TABLE 4
WORKSTATION CONTROLLER PLA EQUATIONS FOR PLA 360

SB0, SB1, SB2 = cycstate;  /* See Appendix 2 */

| cycstate value | STATE NAME |
|---|---|
| 0 | CYC_IDLE |
| 1 | ST_IO |
| 4 | ST_MEM |
| 5 | END_CMD |
| 7 | CLR_CSS |

| LCMD value | NAME |
|---|---|
| 0000 | IORD_W_CMD_L |
| 0001 | MEMR_W_CMD_L |
| 0010 | IOWR_W_CMD_L |
| 0011 | MEMW_W_CMD_L |
| 0100 | IORD_HB_CMD_L |
| 0101 | IORD_LB_CMD_L |
| 0110 | MEMR_HB_CMD_L |
| 0111 | MEMR_LB_CMD_L |
| 1000 | IOWR_HB_CMD_L |
| 1001 | IOWR_LB_CMD_L |
| 1010 | MEMW_HB_CMD_L |
| 1011 | MEMW_LB_CMD_L |

```
CYDONE = cycstate:END_CMD;
CLRCSS = cycstate:CLR_CSS;
/* SEE TABLE 2 FOR COMMAND NAMES ASSOCIATED WITH LCMD0-3 */
MEMRD = cycstate:ST_MEM &  ( MEMR_W_CMD_L # MEMR_HB_CMD_L
                             # MEMR_LB_CMD_L);
MEMWR = cycstate:ST_MEM &  ( MEMW_W_CMD_L # MEMW_HB_CMD_L
                             # MEMW_LB_CMD_L);
IORD  = cycstate:ST_IO &   ( IORD_W_CMD_L # IORD_HB_CMD_L
                             # IORD_LB_CMD_L);
IOWR  = cycstate:ST_IO &   ( IOWR_W_CMD_L # IOWR_HB_CMD_L
                             # IOWR_LB_CMD_L);
```

Control Logic

Referring to FIG. 7, the control logic 170 for the workstation controller works as follows. A four switch DIP switch bank 400 generates a four bit signal DS0-3 which identifies the workstation/controller. For convenience, this value shall sometimes be called the station ID. All data packets generated by the host controller include a header byte that includes a four bit workstation identifier. This four bit identifier is received on lines SD0-3 of the internal buss 155 and is then compared with the station ID DS0-3 by comparator 402. If the two values match, the comparator 402 generates an enabled signal called ADDRMATCH.

The second part of each received data packet header is a four bit command value. See Table 2 for a list of the host commands. The command value is received on lines SD4-7 of the internal bus 155 and is stored in a latch 404 by the signal CMDCLK. The four bit output of the latch 404 is labelled LCMD0-3 (which stands for logical command, bits 0 through 3). The latched LCMD signals are used by the bus decoder 240, as discussed above with reference to FIG. 6. A multiplexer 406 puts either the LCMD signals, or the signals on lines SD4-7 of the internal bus onto the four lines labelled ICMD0-3 (which stands for input command, bits 0 through 3), as determined by the selection signal ICMD_SEL. The ICMD signals are used by the state machine in programmed logic array 410, as will be explained in more detail below.

An eight bit buffer 412 is used to generate the data packet header for data packets generated by the workstation controller 150. In particular, this buffer 412 asserts the station ID and a four bit output command value OCMD0-3 when the signal OCMDOE is enabled. Note that many data packets generated by the workstation controller 150 are single byte packets that merely acknowledge receipt of a command from the host computer. In these cases the output command is the same as the received input command, as represented on the signal lines labelled ICMD0-3.

A clock circuit 414 generates a 20 MHz clock signal CLK20MHZ that is used by the main programmed logic array 410 to control the pace of state transitions in this PLA's state machine. It should be noted that, in general, the clock rate used by the state machine in the workstation controller 170 should operate at twice the rate that data bytes are received from the optical network.

A monostable 416 is used to generate a RESET signal that causes several circuits in the workstation controller to be reset to a known state. The reset monostable 416 is triggered by the signal ST_RST, which is generated either when a reset command is received from the host controller, and whenever the workstation controller is powered up.

Next, we describe the operation of the five programmed logic arrays (PLAs) 410, 420, 422, 424 and 426 in the control logic 170. PLA 410 is the PLA which implements the state machine described above with respect to FIG. 4. The hexadecimal state values shown in FIG. 4 and listed in Table 1 correspond to the value of signals SLST0-6 output by PLA 410. PLA 410 also outputs a 10 MHz clock signal CLK10MHZ, generated by dividing the 20 MHz signal CLK20MHZ by two, and a strobe signal TXSTB. These two signals are the clock and strobe signals used by the transmitter 212, as will be understood by those skilled in the art.

The inputs to the PLA 410 are as follows: the 20 MHz clock CLK20MHZ, the address match signal ADDRMATCH, the two tag bits SDO8 and SDO9 on the last byte received from the optical network, the four bit input command ICMD0-3, an interrupt signal INTCHNG which is generated by the bus decoder as described above, an input ready signal RXFIFO_RDY generated by the FIFO's control circuitry whenever the FIFO 215 contains at least one byte of data that has not yet been processed, a signal CYDONE indicating the completion of a memory or I/O operation, and the RESET signal.

Appendix 1 contains a pseudocode program which denotes the conditions required to move from each logical state to another logical state. Table 5 contains the equations for the TXSTB signal, and for the intermediate signals used by the PLA 410 for controlling state transitions.

PLA 420 generates the output command values used in data packets generated by the workstation controller. PLA 420 also generates the signals for turning three LEDs 430 off and on. These LEDs 430 are colored red, green and yellow. Table 6 lists the PLA equations for the output signals generated by PLA 420.

PLA 422 generates the tag bits SDI8 and SDI9 for data packets generated by the workstation controller. It also generates the clock signals LOADCLK, MADCLK and HIADCLK for loading address values into the bus interface 160, the FIFO output enable signal FIFOOE, the start cycle signal ST_CYCLE, and the signal RDRXDAT for reading the next byte stored in the FIFO 215. Table 7 list the PLA equations for generating these signals.

PLA 424 generates the output enable signals OCMDOE, UPDATOE, LODATOE and INTROE. It also generates the clock signals LODATCLK and HIDATCLK for loading data values into the bus interface 160. Table 8 list the PLA equations for generating these signals.

PLA 426 generates the signals CMDCLK used to latch in the host command in data packet headers, ST_RST for initiating resetting of the controller 150, ICMD_SEL for controlling the multiplexer 406, and DDIR for controlling the direction that data flows through the bus interface 160. Table 9 list the PLA equations for generating these signals.

TABLE 5

| WORKSTATION CONTROLLER PLA EQUATIONS FOR PLA 410 | |
|---|---|
| TXSTB = slstate:RD_ACK_DN # slstate:BYTE1_DN # slstate:BYTE2_DN # slstate:WR_ACK_DN # slstate:RST_ACK_DN # slstate:PASS_HOST_DN # slstate:PASS_OTHER_DN # slstate:NETCLR_DN # slstate:STAT_CMD_DN # slstate:STAT_DN; | |
| IORD_W_CMD | = !ICMD3 & !ICMD2 & !ICMD1 & !ICMD0; |
| MEMR_W_CMD | = !ICMD3 & !ICMD2 & !ICMD1 & ICMD0; |
| IOWR_W_CMD | = !ICMD3 & !ICMD2 & ICMD1 & !ICMD0; |
| MEMW_W_CMD | = !ICMD3 & !ICMD2 & ICMD1 & ICMD0; |
| IORD_HB_CMD | = !ICMD3 & ICMD2 & !ICMD1 & !ICMD0; |
| IORD_LB_CMD | = !ICMD3 & ICMD2 & !ICMD1 & ICMD0; |
| MEMR_HB_CMD | = !ICMD3 & ICMD2 & ICMD1 & !ICMD0; |
| MEMR_LB_CMD | = !ICMD3 & ICMD2 & ICMD1 & ICMD0; |
| IOWR_HB_CMD | = ICMD3 & !ICMD2 & !ICMD1 & !ICMD0; |
| IOWR_LB_CMD | = ICMD3 & !ICMD2 & !ICMD1 & ICMD0; |
| MEMW_HB_CMD | = ICMD3 & !ICMD2 & ICMD1 & !ICMD0; |
| MEMW_LB_CMD | = ICMD3 & !ICMD2 & ICMD1 & ICMD0; |
| RESET_CMD | = ICMD3 & ICMD2 & !ICMD1 & !ICMD0; |
| STAT_CMD | = ICMD3 & ICMD2 & !ICMD1 & ICMD0; |
| NETCLR_CMD | = ICMD3 & ICMD2 & ICMD1 & !ICMD0; |
| XTRA_CMD | = ICMD3 & ICMD2 & ICMD1 & ICMD0; |
| WRITE_CMD | = IOWR_W_CMD # MEMW_W_CMD # IOWR_HB_CMD # IOWR_LB_CMD # MEMW_HB_CMD # MEMW_LB_CMD; |
| READ_CMD | = IORD_W_CMD # MEMR_W_CMD # IORD_HB_CMD # IORD_LB_CMD # MEMR_HB_CMD # MEMR_LB_CMD; |
| WORD_RD_CMD | = IORD_W_CMD # MEMR_W_CMD; |
| WORD_WR_CMD | = IOWR_W_CMD # MEMW_W_CMD; |

TABLE 5-continued
WORKSTATION CONTROLLER PLA EQUATIONS FOR PLA 410

```
M_OR_IO     = IORD_W_CMD # MEMR_W_CMD # IOWR_W_CMD
              # MEMW_W_CMD # IORD_HB_CMD # IORD_LB_CMD
              # MEMR_HB_CMD # MEMR_LB_CMD # IOWR_HB_CMD
              # IOWR_LB_CMD # MEMW_HB_CMD # MEMW_LB_CMD;
HOST2BYTE   =     !SD09 & !SD08;
HOST1BYTE   =     !SD09 &  SD08;
SL2BYTE     =      SD09 & !SD08;
SL1BYTE     =      SD09 &  SD08;
```

TABLE 6
WORKSTATION CONTROLLER PLA EQUATIONS FOR PLA 420

```
RESET_ACK =   C  /* 1100 */
STAT_ACK  =   D  /* 1101 */
OCMD      =   (slstate:SEND_WR_ACK)    & ICMD
            # (slstate:SEND_RD_ACK)    & ICMD
            # (slstate:SEND_RST_ACK)   & RESET_ACK
            # (slstate:SEND_STAT_CMD)  & STAT_ACK
```

TABLE 6-continued
WORKSTATION CONTROLLER PLA EQUATIONS FOR PLA 420

```
            # (slstate:IDLE)           & ICMD;
REDLED  =   slstate:START_RST # slstate:PASS_HOST_DN
            # slstate:LATCMD;
GRNLED  =   slstate:RST_ACK_DN # slstate:PASS_OTHER
            # slstate:BYTE1_DN # slstate:WR_ACK_DN;
CLRLED  =   slstate:PASS_NETCLR # slstate:NETCLR_DN;
```

TABLE 7
WORKSTATION CONTROLLER PLA EQUATIONS FOR PLA 422

```
SDI8 =      slstate:PASS_HOST_DN      & SDO8
          # slstate:PASS_OTHER        & SDO8
          # slstate:PASS_OTHER_DN     & SDO8
          # slstate:NETCLR_DN         & SDO8
          # slstate:PASS_SLAVE_DN     & SDO8
          # slstate:IDLE              & SDO8
          # slstate:SEND_RST_ACK
          # slstate:RST_ACK_DN
          # slstate:SEND_STAT_CMD
          # slstate:STAT_CMD_DN
          # slstate:SEND_RD_ACK
          # slstate:RD_ACK_DN
          # slstate:SEND_WR_ACK
          # slstate:WR_ACK_DN;
SDI9 =      slstate:PASS_HOST_DN      & SDO9
          # slstate:PASS_OTHER        & SDO9
          # slstate:PASS_OTHER_DN     & SDO9
          # slstate:NETCLR_DN         & SDO9
          # slstate:IDLE              & SDO9
          # slstate:SEND_RST_ACK
          # slstate:RST_ACK_DN
          # slstate:SEND_STAT_CMD
          # slstate:STAT_CMD_DN
          # slstate:SEND_STAT
          # slstate:STAT_DN
          # slstate:SEND_RD_ACK
          # slstate:RD_ACK_DN
          # slstate:SEND_BYTE1
          # slstate:BYTE1_DN
          # slstate:SEND_BYTE2
          # slstate:BYTE2_DN
          # slstate:SEND_WR_ACK
          # slstate:WR_ACK_DN;
LOADCLK   = slstate:LATLOAD;
MADCLK    = slstate:LATMAD;
HIADCLK   = slstate:LATHIAD;
FIFOOE    = slstate:IDLE           # slstate:PASS_HOST_DN
          # slstate:PASS_OTHER     # slstate:PASS_OTHER_DN
          # slstate:NETCLR_DN      # slstate:PASS_SLAVE_DN
          # slstate:LATCMD         # slstate:POP_CMD
          # slstate:LATHIAD        # slstate:POP_HIAD
          # slstate:LATMAD         # slstate:POP_MAD
          # slstate:LATLOAD        # slstate:POP_LOAD
          # slstate:WR_BYTE1       # slstate:POP_BYTE1
          # slstate:WR_BYTE2       # slstate:POP_BYTE2;
ST_CYCLE  = slstate:START_RD # slstate:START_WR;
RDRXDAT   = slstate:POP_CMD # slstate:POP_HIAD
          # slstate:POP_MAD # slstate:POP_LOAD
          # slstate:PASS_HOST_DN
          # slstate:PASS_OTHER_DN # slstate:NETCLR_DN
          # slstate:POP_BYTE1 # slstate:POP_BYTE2
          # slstate:PASS_SLAVE_DN;
```

TABLE 8

WORKSTATION CONTROLLER PLA EQUATIONS FOR PLA 424

| | | |
|---|---|---|
| OCMDOE | = slstate:SEND_RST_ACK | # slstate:RST_ACK_DN |
| | # slstate:SEND_STAT_CMD | # slstate:STAT_CMD_DN |
| | # slstate:SEND_RD_ACK | # slstate:RD_ACK_DN |
| | # slstate:SEND_WR_ACK | # slstate:WR_ACK_DN; |
| UPDATOE | = slstate:WR_BYTE1 | # slstate:WR_BYTE2 |
| | # slstate:START_WR | |
| | # slstate:SEND_BYTE2 | # slstate:BYTE2_DN; |
| LODATOE | = slstate:WR_BYTE1 | # slstate:WR_BYTE2 |
| | # slstate:START_WR | |
| | # slstate:SEND_BYTE1 | # slstate:BYTE1_DN; |
| INTROE | = slstate:SEND_STAT # slstate:STAT_DN; | |
| LODATCLK | = slstate:WR_BYTE1; | |
| HIDATCLK | = slstate:WR_BYTE2; | |

TABLE 9

WORKSTATION CONTROLLER PLA EQUATIONS FOR PLA 426

| | |
|---|---|
| CMDCLK | = slstate:LATCMD; |
| ST_RST | = slstate:START_RST; |
| ICMD_SEL | = slstate:POP_LOAD |
| | # slstate:BYTE1_DN |
| | # slstate:POP_BYTE1; |
| DDIR | = slstate:SEND_BYTE1 # slstate:BYTE1_DN |
| | # slstate:SEND_BYTE2 # slstate:BYTE2_DN; |

HOST CONTROLLER

Figure 8:
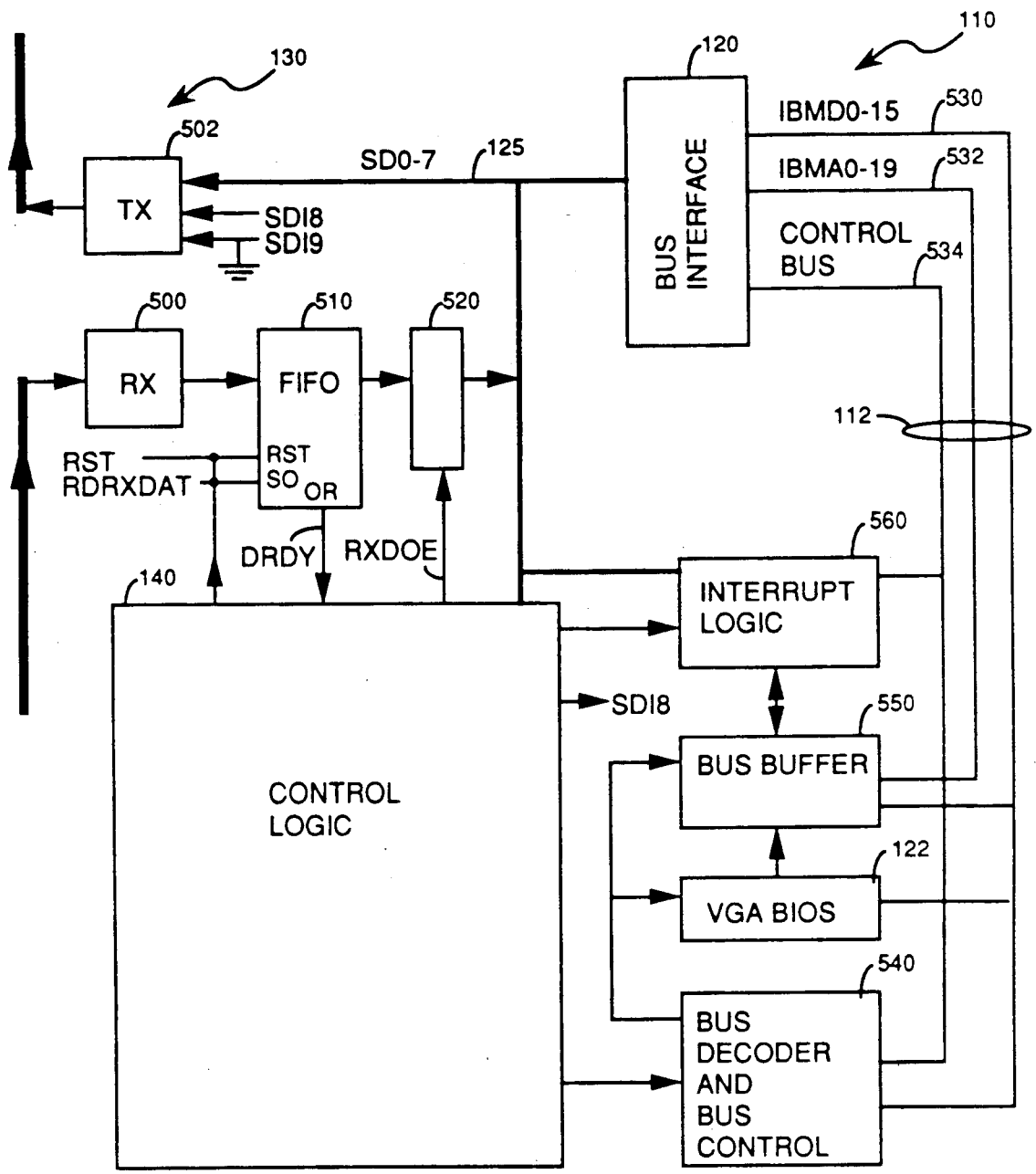
FIGS. 8 and 8A are block diagrams of the host controller in the preferred embodiment of the present invention.

Referring to FIG. 8, the primary components of the host controller 110 are as follows. The optical interface 130 comprises a receiver 500 and a transmitter 502. In the preferred embodiment the receiver and transmitter are standard TAXI chips, manufactured by Advanced Micro Devices, coupled to standard optical signal receiving and transmitting circuits. Data from the optical receiver 500 is stored in a FIFO buffer 510, which in the preferred embodiment is a Cyprus 7C409 64 byte CMOS FIFO.

The FIFO 510 sends a signal called DRDY to the control logic 140 to indicate that at least one byte of unprocessed data is stored in the FIFO 510. The stored data in the FIFO 510 is clocked out by the RDRXDAT signal generated by the control logic 140. The data signals output by the FIFO 510 are asserted on the eight bit internal bus 125 by buffer 520 when the signal RXDOE is enabled by the control logic 140. The eight signals on the bus 125 are labelled SD0 through SD7. The two tag bits from each byte of received data SDO8 and SDO9 are combined into a single signal SL1BYT that is processed directly by the control logic 140.

Figure 8A:
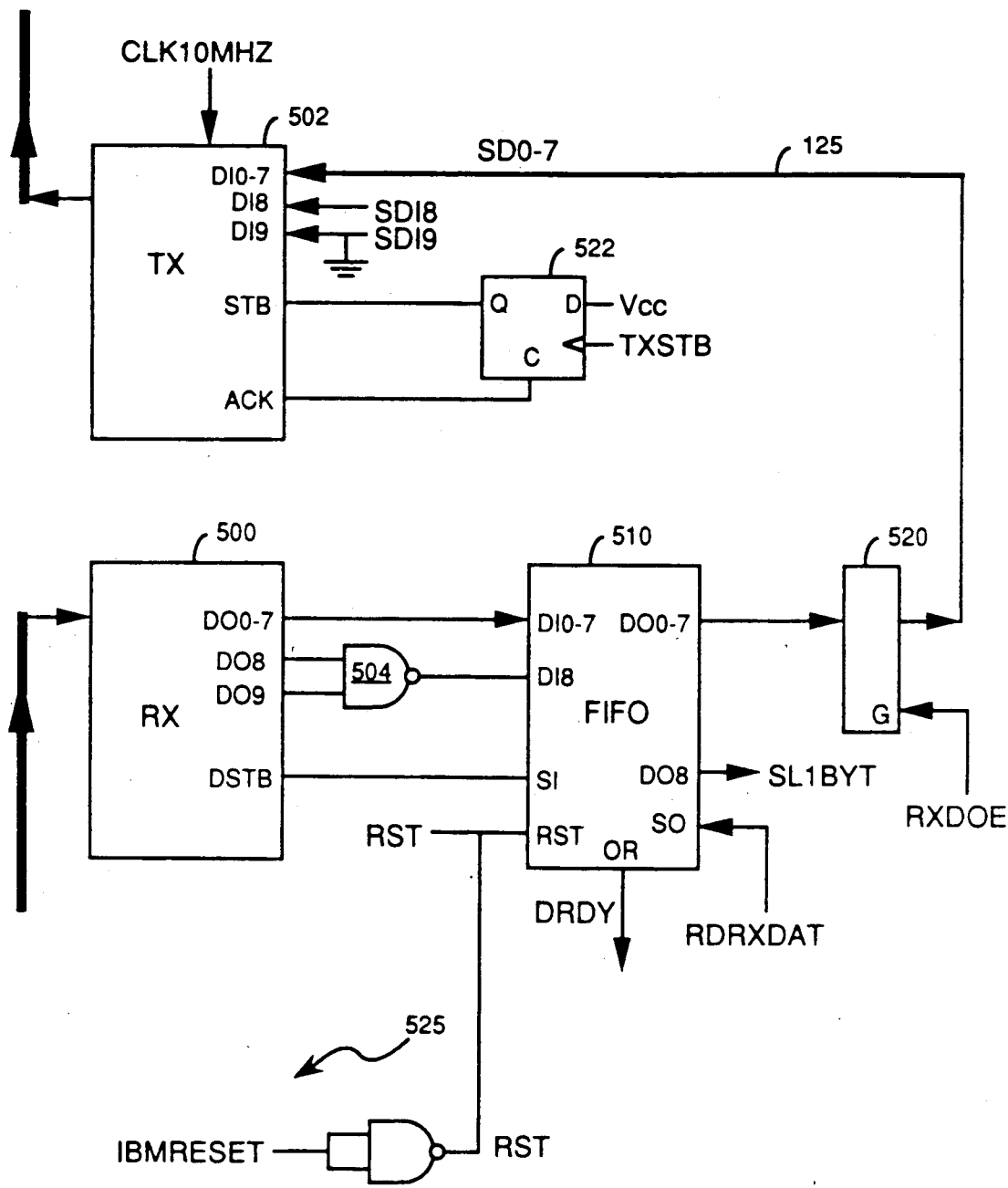

Referring to FIG. 8A, two of the ten bits received from the receiver 500 are logically combined with a NAND gate 504 and the resulting signal is strobed into a FIFO buffer 510 along with the other eight bits received using a strobe signal generated by the receiving TAXI circuit 500. When the data stored in the FIFO 510 is clocked out by the RDRXDAT signal, the ninth bit of data is labelled SL1BYT (which stands for "first byte of slave packet"). This signal is a negative logic signal that is enabled (i.e., low) only when the header of a data packet generated by a workstation controller is received, as denoted by bits eight and nine in the header both being set to a value of "1". All nonzero data received by the host controller that is not a header of a workstation packet should be either a NETCLR command, or the packet data following a workstation packet's header. Any other nonzero data received is considered to be noise and is discarded.

Still referring to FIG. 8A, the transmission of data onto the optical network is initiated when the control logic 140 generates an TXSTB strobe signal. The TXSTB signal sets a flip flop 522, the output of which strobes the TAXI transmission circuit 502. The TAXI transmission circuit 502 generates an ACK signal that resets the flip flop 522 after the data on the bus 125 has been strobed into the transmission circuit.

A reset circuit 525 generates a brief RST signal whenever a reset signal IBMRESET is received from the host computer, which happens when either the host computer or host controller is turned on, or the host controller's watchdog circuit 740 (see FIG. 15) prompts the host computer to sent a reset signal. The RST signal is used by the host controller to reset several circuits, including the FIFO 510 to a known state.

Referring back to FIG. 8, bus interface 120 couples the internal bus 125 to the host computer's bus 112 which includes a data bus 530 carrying signals IBMD0 through IBMD15, address bus 532 carrying signals IBMA0 through IBMA19, and control signal bus 534 which carries a number of signals described below. Signals from the control logic 140 control the flow of data between the internal bus 125 and the host computer busses 530, 532 and 534.

The bus decoder and bus control circuit 540 both decodes and generates signals on the control bus 534.

The VGA BIOS 122 is coupled to the host computer's address and data busses 530 and 532 by a bus buffer 550. Finally, an interrupt logic circuit 560 is used to store status information for each of the workstations in the computer system, and to send that information to the host computer. Retrieved status information is sent to the host's data bus 530 via the bus buffer 550.

Host's Write State Machine

The host controller's control logic 140 uses two state machines: one to control the process of sending of data packets to workstations controllers (herein called the write state machine) and one to control the process of receiving data packets sent by workstation controllers 150 to the host controller 110 (herein called the read state machine).

Figure 9:
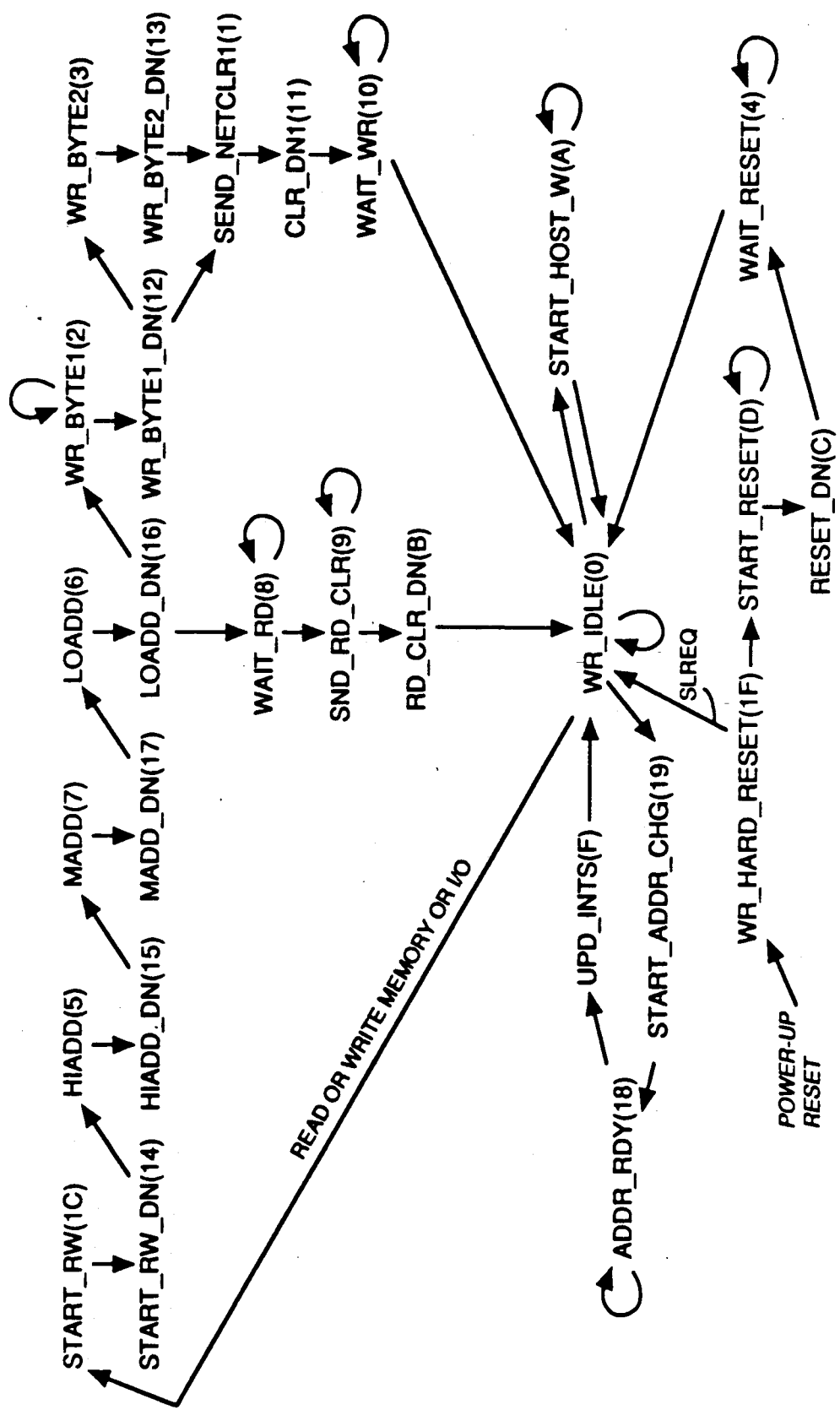
FIG. 9 depicts a state diagram for the data writing operations of the host controller shown in FIG. 8.

Referring to FIG. 9, there is shown a state machine flow diagram for the host controller's write state machine. Each logical state has both a name and a numerical state value denoted in hexadecimal format (base sixteen) shown in parentheses. Table 10 contains a list of the logical states for the host controller's write state machine along with a brief description of the purpose or function of each state. Appendix 3 contains a pseudocode program which denotes the conditions required to move from each logical state to another logical state.

When combined with the PLA equations in Tables 12 through 21, Appendix 3 provides a complete description of the circuitry for the write state machine used in the preferred embodiment of the host controller 110.

Whenever the host computer generates bus signals indicative of a read or write operation to one of the workstations, the write machine enters the START_RW state. In this state it generates a data packet header to be sent to the workstation being addressed. The packet header denotes the workstation being addressed and a four bit command value. In the START_RW_DN state the host controller completes transmission of the packet header. It should be noted that all read and write commands use a three byte address. The HIADD and HIADD_DN states are used to send the high byte of the address. The MADD and MADD_DN states are used to send the middle byte of the address. The LOADD and LOADD_DN states are used to send the low byte of the address.

The next action by the write state machine depends on whether a read or write operation is being executed. If a read operation is being executed, the state machine goes first to the WAIT_RD state and remains in that state until the host controller receives the requested data from the specified workstation. Then it goes to the SND_RD_CLR state, in which it sends a NETCLR message to all the workstations to indicate that the optical bus is now clear. The write state machine may stay in the SND_RD_CLR state for two cycles in order to synchronize the sending of the NETCLR message with the host controller's 10 megahertz transmission clock signal, CLK10MHZ. The transmission of the NETCLR message is completed in the RD_CLR_DN state, and then the state machine returns to the WR_IDLE state to wait for the next transaction.

If a write operation is being executed, the write state machine goes from the LOADD DN state to the WR_BYTE1 state, in which it transmits the first byte of a data that the host computer is sending to the specified workstation. Note that the data sent to the workstation was obtained from the host computer's data bus via the bus interface 120. The write state machine may stay in the WR_BYTE1 state for two cycles in order to synchronize the sending of the data message with the host controller's 10 megahertz transmission clock signal, CLK10MHZ. States WR_BYTE1 and WR_BYTE1_DN are used to transmit one byte of data. If a second byte of data is to be sent to the workstation, that byte of data is sent using states WR_BYTE2 and WR_BYTE2_DN. Then, after either one or two bytes of data have been sent, the state machines goes to the SEND_NETCLR1 state. During the SEND_NETCLR1 and CLR_DN1 states a NETCLR message is transmitted onto the optical bus. It should be noted that each workstation controller sends a one-byte acknowledgment message when it receives a write data command packet. After sending the NETCLR message, the write state machine stays in the WAIT_WR state until this acknowledgment message is received, and then it returns to the WR_IDLE state.

When the host controller is powered up, or when a watchdog circuit 740 (shown in FIG. 15) in the host controller resets the controller because it has become stuck in a wait state, the write state machine enters the WR_HARD_RESET state. While in the WR_HARD_RESET state the host controller clears its FIFO 510 and interrupt status RAM shown in FIG. 15 and resets several other circuits. Next, in the START_RESET state it sets up a RESET command packet, and when the state machine goes to the RESET_DN state the RESET command packet is sent to all the workstation controllers. The write machine may stay in the START_RESET state for two clock cycles in order to synchronize the sending of the RESET packet with the controller's 10 megahertz transmission clock. Then the write machine stays in the WAIT_RESET state while it waits for the RESET packet to be transmitted through the optical bus to all the workstations and back to the host controller. When the RESET packet arrives back at the host controller, the write state machine returns to the WR_IDLE state. If, however, the host controller's watchdog circuit 740 (see FIG. 15) caused the host computer to perform a reset, and thereby indirectly caused the host controller to enter the WR_HARD_RESET state the SLREQ signal will be active and the write state machine will go directly to the WR_IDLE state, and will not send a RESET command to the workstation controllers.

Whenever the host computer performs a context switch, the write state machine enters the START_ADDR_CHG state, during which it reads and latches the workstation ID for the new context from the host computer's data bus. Then, it waits in the ADDR_RDY state until the host computer completes the context switch, detected by a change in the address value on the host's address bus. Then it goes to the UPD_INTS state, in which it generates a status signal called ANYINT which is enabled if there are any unsatisfied interrupts pending for the specified workstation, before returning to the WR_IDLE state. The ANYINT signal is transmitted to the host computer on the EGAINT control line (see FIG. 15).

Figure 15:
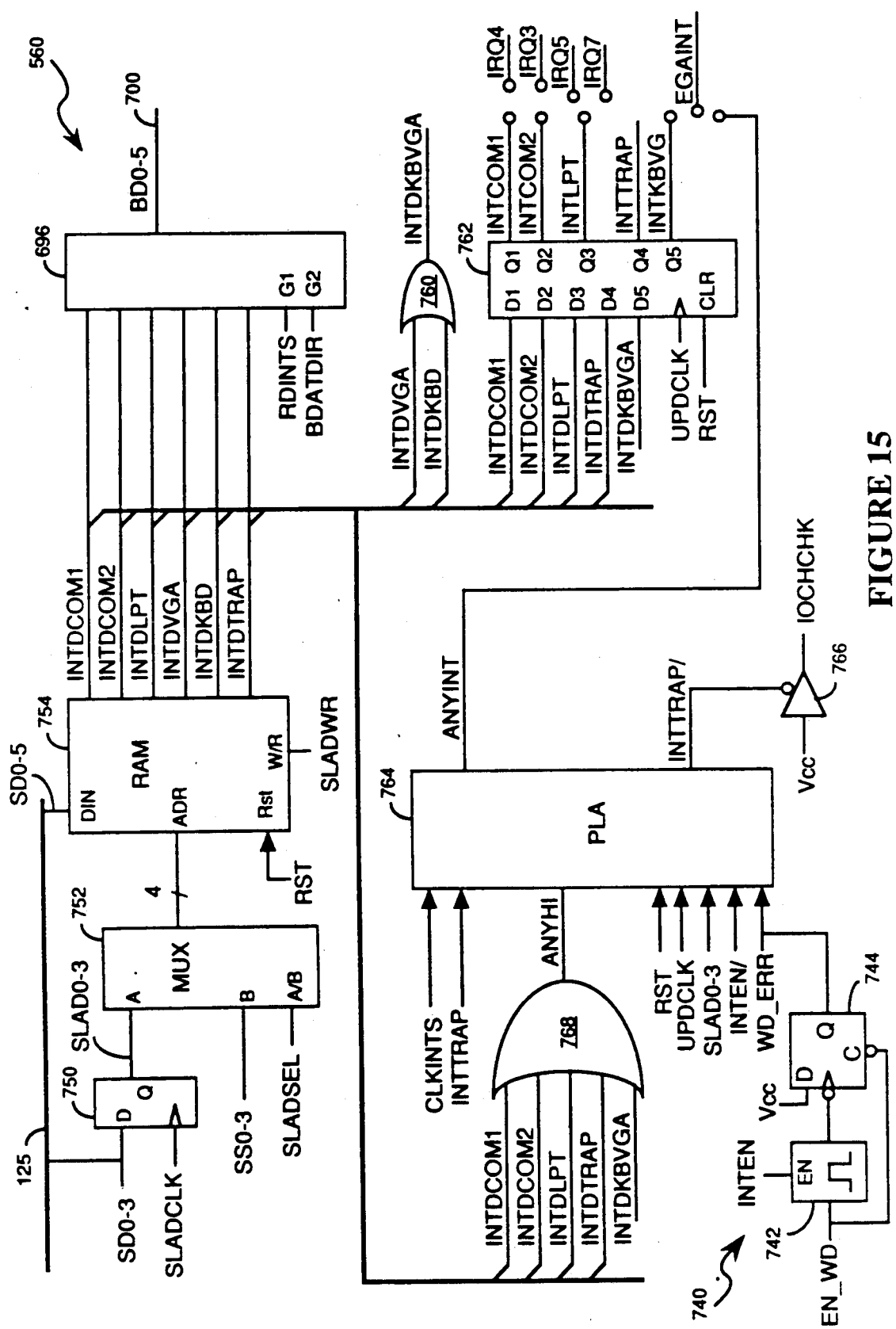
FIG. 15 is a block diagram of the interrupt handling hardware in the workstation controller shown in FIG. 8.

The START_HOST W state is entered whenever the host computer writes status information into the host controller's interrupt status memory 754 in the interrupt logic 560 (see FIG. 15). Then the write state machine returns to the WR_IDLE state.

TABLE 10

HOST CONTROLLER
WRITE MACHINE LOGICAL STATES

| STATE NAME | VALUE | DESCRIPTION |
|---|---|---|
| WR_IDLE | 00 | WAIT for next data transaction |
| START_RW: | 1C | Send command header to a workstation. |
| START_RW_DN | 14 | Complete sending command header |
| HIADD | 05 | Send high byte of address |
| HIADD_DN | 15 | Complete sending high byte |
| MADD | 07 | Send middle byte of address |
| MADD_DN | 17 | Complete sending middle byte |
| LOADD | 06 | Send low byte of address |
| LOADD_DN | 16 | Complete sending low address byte |
| WR_BYTE1 | 02 | Send first byte of data |
| WR_BYTE1_DN | 12 | Complete sending first data byte |
| WR_BYTE2 | 03 | Send second byte of data |
| WR_BYTE2_DN | 13 | Complete sending second data byte |
| SEND_NETCLR1 | 01 | Mark end of data packet by sending NETCLR message. |
| CLR_DN1 | 11 | Complete sending NETCLR |
| WAIT_WR | 10 | Wait for ack message from workstation to which data was transmitted. |
| WAIT_RD | 08 | Wait for specified data from workstation. Host controller |

TABLE 10-continued
HOST CONTROLLER
WRITE MACHINE LOGICAL STATES

| | VALUE | DESCRIPTION |
|---|---|---|
| | | is stalled until data is available. Leave state WAIT_RD when received data is put on host's bus. |
| SND_RD_CLR | 09 | Generate NETCLR packet to inform workstation controllers that the optical network is now available for sending interrupts. |
| RD_CLR_DN | 0B | Send NETCLR packet. |
| POWER UP RESET SEQUENCE | | |
| WR_HARD_RESET | 31 | Clear internal registers when power comes on. |
| START_RESET | 13 | Set up reset message. |
| RESET_DN | 12 | Send reset message to all workstations. |
| WAIT_RESET | 04 | Wait for reset message to come back around the optical bus to the host controller. |
| WRITE INTERRUPT STATUS | | |
| START_HOST_W | 10 | Write status sent by host computer into status memory. |
| CONTEXT SWITCH BY HOST COMPUTER | | |
| START_ADDR_CHG | 25 | Read in workstation ID from host computer's data bus. |
| ADDR_RDY | 24 | Wait for host to complete context switch. |
| UPD_INTS | 15 | Update interrupt status signal ANYINT which is sent to the host's control bus. |
| EXTRA (UNDEFINED) STATES | | |
| WR_XTRA1 | 0E | |
| WR_XTRA2 | 1A | |
| WR_XTRA3 | 1B | |
| WR_XTRA4 | 1D | |
| WR_XTRA5 | 1E | |

Host's Read State Machine

Figure 10:
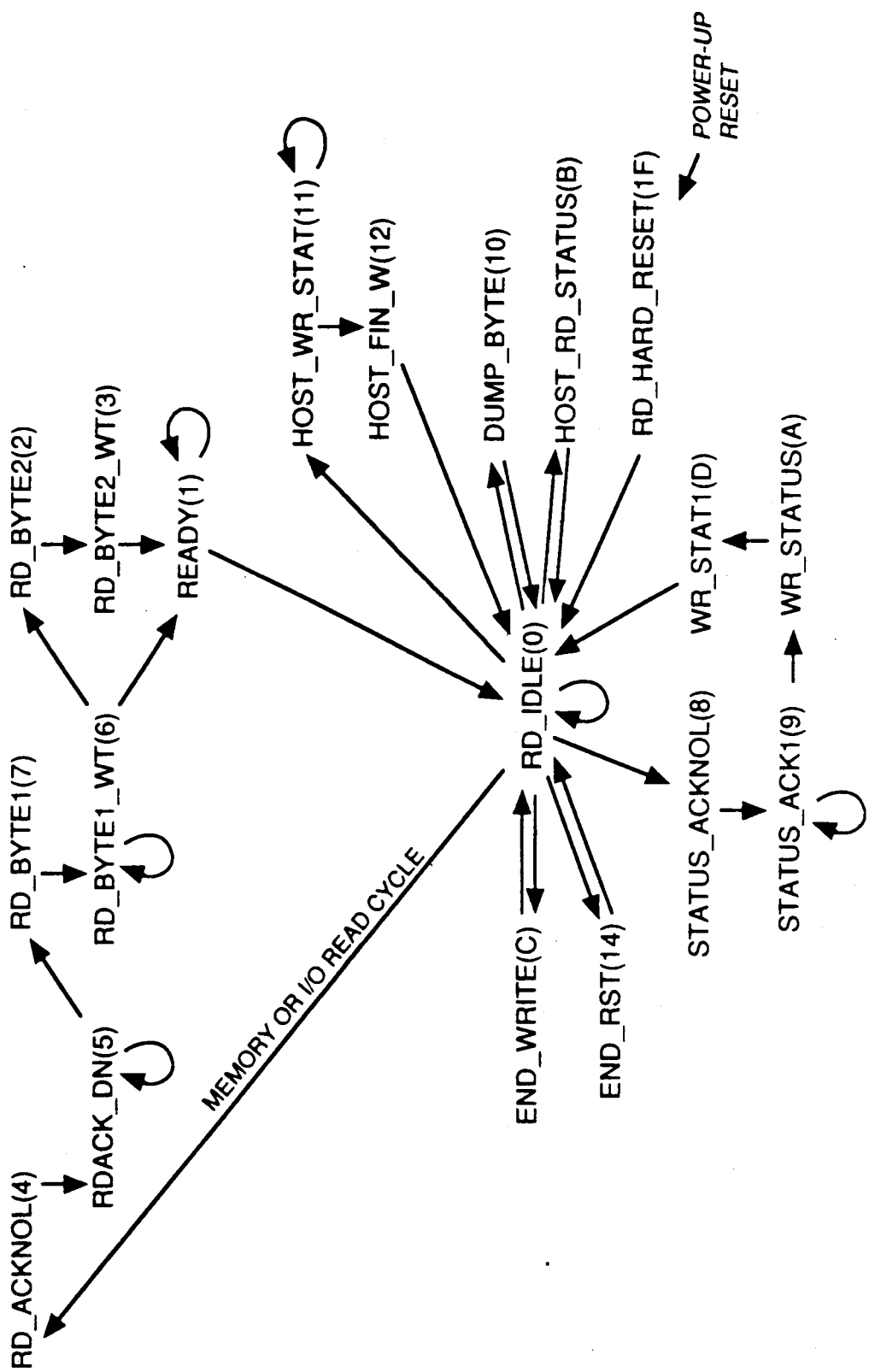
FIG. 10 depicts a state diagram for the data reading operations of the host controller shown in FIG. 8.

Referring to FIG. 10, there is shown a state machine flow diagram for the host controller's read state machine. Table 11 contains a list of the logical states for the host controller's read state machine along with a brief description of the purpose or function of each state. Appendix 4 contains a pseudocode program which denotes the conditions required to move from each logical state to another logical state. When combined with the PLA equations in Tables 12 through 21, Appendix 4 provides a complete description of the circuitry for the read state machine used in the preferred embodiment of the host controller 110.

Whenever a data packet is received from a workstation controller in response to a read command sent by the host controller, the read state machine goes to the RD_ACKNOL state. The RD_ACKNOL and RDACK_DN states are used for receiving the header of the workstation data packet. The read state machine then stays in the RDACK_DN state until the first byte of data from the workstation is received. Then states RD_BYTE1 and RD_BYTE1_WT are used for receiving the first byte of data in the workstation data packet and latching that data into the appropriate buffer of the bus interface 120. If the workstation data packet includes two bytes of data, the second byte of data is read in and latched into the bus interface 120 during states RD_BYTE2 and RD_BYTE2_WT. Then the read state machine waits in the READY state until the write state machine sends the received data to the host computer, after which the host computer will change the address value on the address bus, indicating that it has received requested data.

When a workstation controller sends a interrupt status information packet to the host controller, it uses the STATUS_ACKNOL state in the read machine to decode the header of that packet and the STATUS_ACK state to wait for the data byte following the header to be received. Next, in the WR_STATUS state the data in the received packet is put onto the internal bus 125, and written into a high speed memory in the interrupt logic 560 during the WR_STAT1 state. Then the read state machine returns to the RD_IDLE state.

The read state machine enters the RD_HARD_RESET state whenever a power up reset occurs. The END_RST state occurs when a reset command sent by the host controller goes all the way around the optical bus and returns to the host controller.

The HOST_WR_STAT state in the read state machine corresponds to the STAR_HOST_W state in the write machine, as described above. In this state, data received from the host computer's data bus is loaded into the status information memory in the interrupt logic 560.

The END_WRITE state occurs when the a write acknowledgment message is received from a workstation controller. Finally, the DUMP_BYTE state is used to dispose of noise signals received by the host controller from the optical bus.

TABLE 11
HOST CONTROLLER
READ MACHINE LOGICAL STATES

| | VALUE | DESCRIPTION |
|---|---|---|
| STATE NAME | | |
| RD_IDLE | 00 | Main branching location from which various functions are undertaken |
| MEMORY OR I/O READ CYCLES: | | |
| RD_ACKNOL | 04 | Read header of message sent by workstation, which immediately precedes the requested data. |
| RD_ACK_DN | 05 | Wait for data to be received to accommodate variable number of wait states. |
| RD_BYTE1 | 07 | Read in first byte of data. |
| RD_BYTE1_DN | 06 | Finish reading first byte of data, and wait for next byte to be received if multiple bytes are being sent. |
| RD_BYTE2 | 02 | Read in second byte of data. |
| RD_BYTE2_DN | 03 | Finish reading in second byte of data. |
| READY | 01 | Wait for host computer to change address value, indicating that it has received requested data. |
| HOST_RD_STATUS | 0B | Corresponds to START_HOST_W (0A) state in Write Machine. Reads in status info sent by workstation and stores it in Host Controller. Puts info out onto host's bus. Initiated by host computer. |
| STORE STATUS INFORMATION RECEIVED FROM HOST | | |
| HOST_WR_STATUS | 11 | Corresponds to the START_HOST_W state in Write Machine. |
| HOST_FIN_W | 12 | Strobe status information received from host computer |

TABLE 11-continued
HOST CONTROLLER
READ MACHINE LOGICAL STATES

| | VALUE | DESCRIPTION |
|---|---|---|
| | | into status memory. |
| INTERRUPT STATUS PACKET COMES IN OFF THE NET (SERIAL BUS) | | |
| STATUS_ACKNOL | 08 | Read in header status packet. Identifies workstation and nature of packet. |
| STATUS_ACK1 | 09 | Wait for data following status packet header. |
| WR_STATUS | 0A | Read in status information. |
| WR_STAT1 | 0D | Store status info in host controller. Send this information to host computer. |
| OTHER STATES | | |
| DUMP_BYTE | 10 | If Read Machine receives unsolicited data, excluding an interrupt status packet, from the optical bus, it is dumped. |
| RD_HARD_RESET | 1F | Hardware fault. |
| END_RST | 14 | Receive Reset Command sent by Host Controller over the serial bus. This corresponds to state WAIT_RESET in Write Machine. |
| END_WRITE | 0C | Receive NETCLR message sent by the host controller. |
| EXTRA (UNDEFINED) STATES | | |
| RD_XTRA1 | 0E | |
| RD_XTRA2 | 0F | |
| RD_XTRA3 | 13 | |
| RD_XTRA4 | 15 | |
| RD_XTRA5 | 16 | |
| RD_XTRA6 | 17 | |
| RD_XTRA7 | 18 | |
| RD_XTRA8 | 19 | |
| RD_XTRA9 | 1A | |
| RD_XTRA10 | 1B | |
| RD_XTRA11 | 1C | |
| RD_XTRA12 | 1D | |
| RD_XTRA13 | 1E | |

Host Controller: Bus Interface

Figure 11:
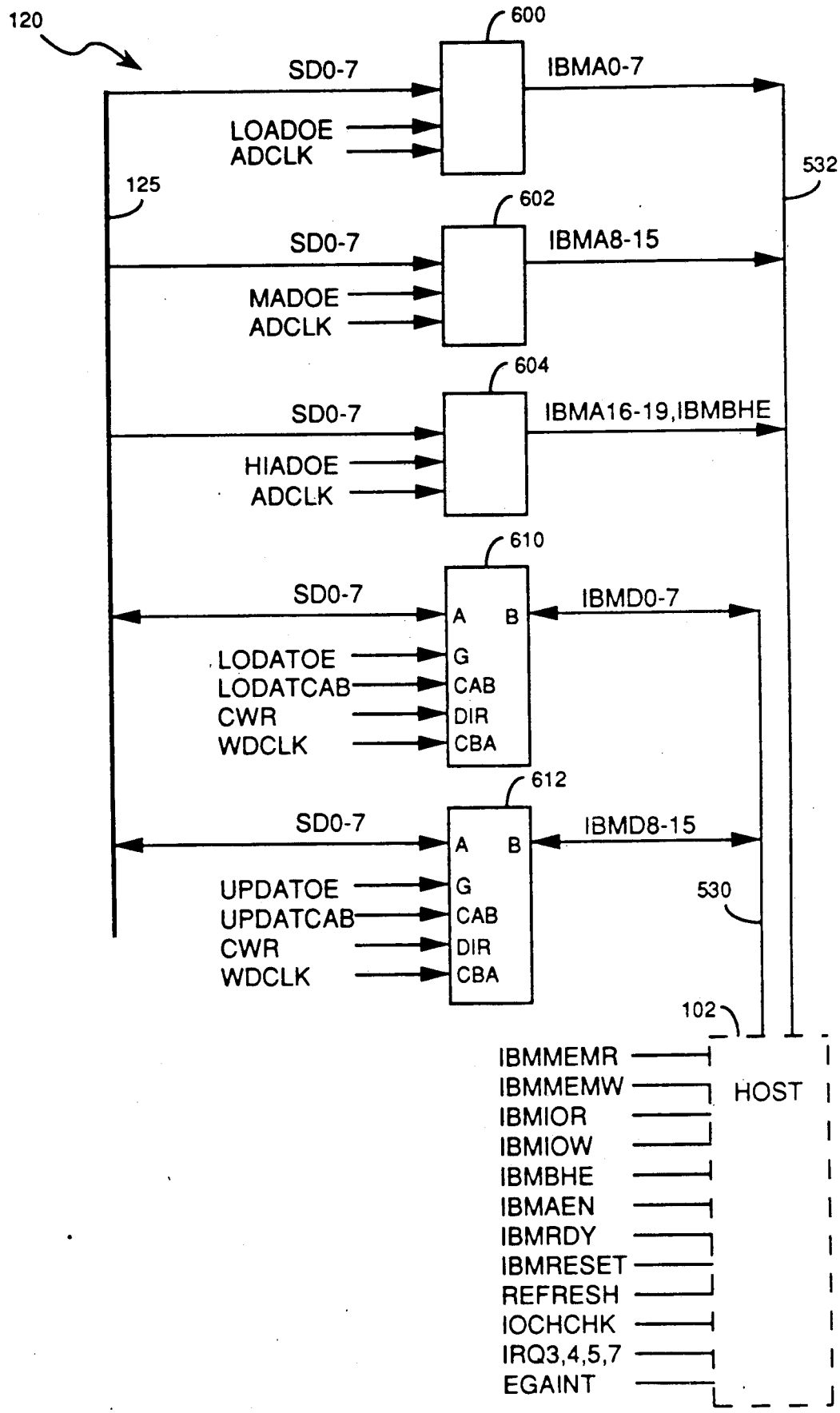
FIG. 11 is a block diagram of the host bus interface in the host controller shown in FIG. 8.

Referring to FIG. 11, the bus interface 120 consists of three latches 600, 602, 604 for latching in the low, middle and high order address bytes used by the host computer in read and write operations. The three bytes of the address value on the host computer's address bus are loaded into all three latches 600, 602 and 604 simultaneously by the ADCLK signal. The address values on the A0 through A7 lines of the host computer's address bus 532 are latched into the low order address latch 600, the values on the A8 through A15 lines are latched into the middle order address latch 602, and the values on lines A16 through A19 are latched into the high order address latch 604. The latched address values are asserted, one at a time, onto the internal bus 125. The LOADOE signal enables the values in the low order address latch 600 to be asserted onto the internal bus 125, the MADOE signal enables the values in the middle order address latch 602 to be asserted onto the internal bus, and the HIADOE signal enables the values in the high order address latch 604 to be asserted onto the internal bus.

Two bidirectional latches 610 and 612 are used for transferring data between the internal bus 125 and the upper and lower bytes of the host computers's data bus 530. The WDCLK signal is used latch data from the host's data bus 530 into both of the data latches 610 and 612, with the data on lines IBMD0 through IBMD7 being stored in latch 610 and the data on lines IBMD8 through IBMD15 being stored in latch 612. The LODATCAB signal is used to latch data from the internal bus 125 into latch 610, and the UPDATCAB signal is used to latch data from the internal bus 125 into latch 612.

The signal CWR determines the direction of data flow between the internal bus 125 and the host computer's data bus 530. When CWR is enabled and LODATOE is enabled, the data latched in from the internal bus 125 into latch 610 will be asserted on lines IBMD0 through IBMD7 of the host computer's data bus 530. Similarly, when CWR is enabled and UPDATOE is enabled, the data latched in from the internal bus 125 into latch 612 will be asserted on lines IBMD8 through IBMD15 of the host computer's data bus 530.

When CWR is disabled and LODATOE is enabled, the data latched in from the host computer's data bus 530 into latch 610 will be asserted on the internal bus 125. Similarly, when CWR is disabled and UPDATOE is enabled, the data latched in from the host computer's data bus 530 into latch 612 will be asserted on the internal bus 125.

The bus interface 120 also couples the host controller to some of the control signal lines of the control bus of the host computer 102, as shown in FIG. 11.

Host Controller: Bus Decoder

Figure 12:
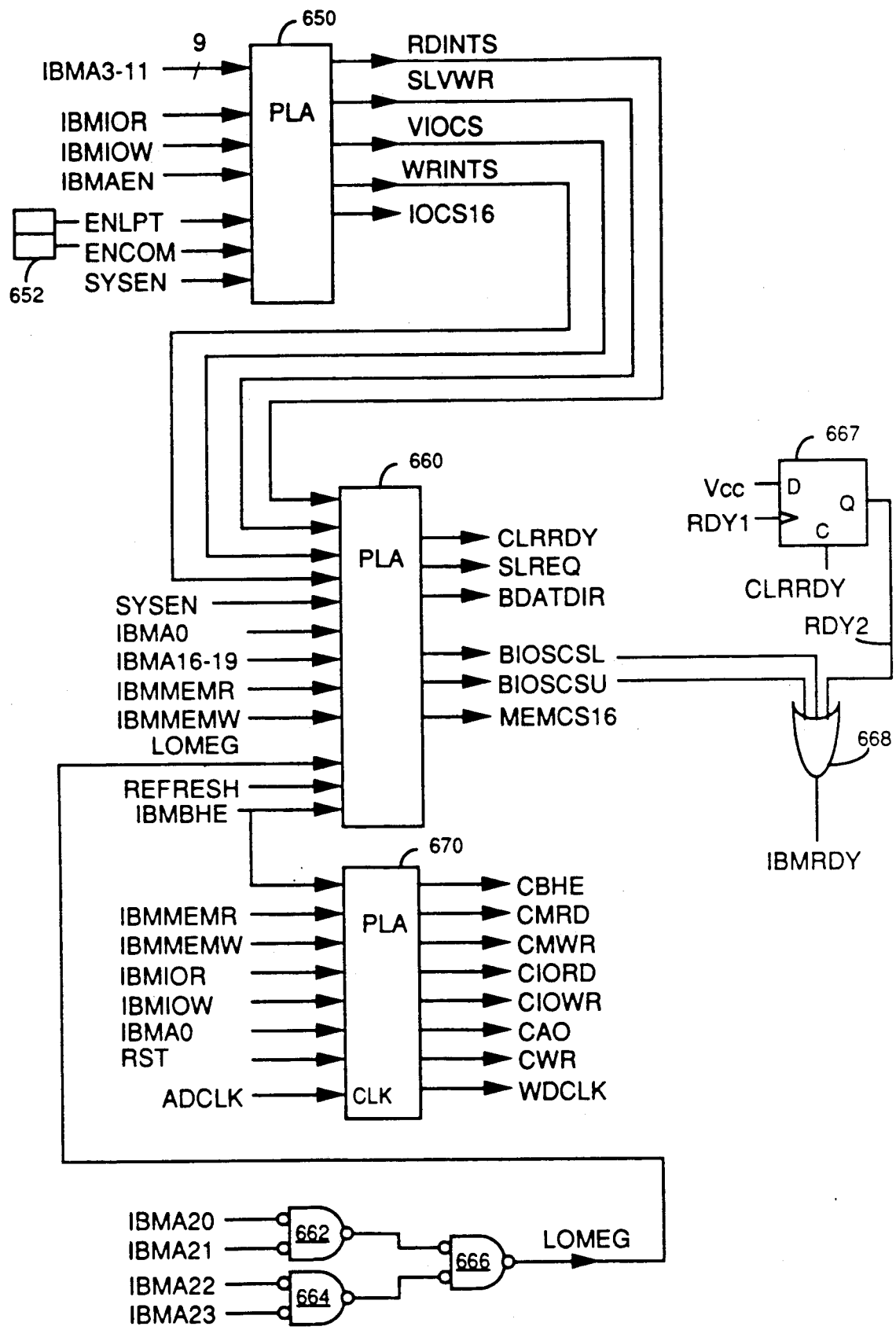
FIG. 12 is a block diagram of the bus decoder in the host controller shown in FIG. 8.

Referring to FIG. 12, the host controller's bus decoder includes three programmed logic arrays (PLAs) 650, 660 and 670. The first PLA 650 decodes the address signals on the host computer's address bus, which indicate the type of operation being performed by the host computer, and generates the signals RDINTS, SLVWR, VIOCS, WRINTS, and IOCS16. The RDINTS signal is enabled when the address signals indicates that the host computer is trying to read the interrupt status information for a workstation. The WRINTS signal is enabled when the host computer sends interrupt status information to be stored in the host controller's interrupt status memory 754 (see FIG. 15). The SLVWR signal is generated when the host computer performs a context switch and indicates the workstation being addressed with a data value on the data bus. The VIOCS signal is enabled when the address value on the host computer's address bus corresponds to any one of a few predefined I/O address ranges. IOCS16 is a control signal that is asserted on the IOCS16 line of the host computer's control bus. The signal IOCS16 is enabled when the host controller wants the host computer to treat the host controller as a sixteen bit I/O device so that sixteen bits can be transferred between the host and host controller at a time.

The PLA equations for the signals generated by PLA 650 are listed in Table 12. Note that input signals ENLPT and ENCOM are set by two jumpers 652 to indicate whether the host computer can address parallel (LPT) and serial (COM1/COM2) ports in the workstations. The input signal SYSEN is a "system enabled" signal received from the host computer and latched into the latch 694 of the bus buffer 550 (see FIG. 13).

PLA 660 further interprets the host computer's address signals, and also the read/write control signals IBMMEMR and IBMMEMW. Three negative input NAND gates 662, 664 and 666 are used to generate a signal called LOMEG signal which is low when address signals IBMA20 through IBMA23 are all low. The LOMEG signal is an input signal to PLA 660.

The signal BDATDIR, generated by PLA 660, controls which direction data flows through the bus interface 120 and the bus buffer 550. SLREQ, generated by PLA 660 is enabled when the address on the address bus corresponds to either the memory or I/O address in a workstation. BIOSCSL and BIOSCSU are chip select signals for accessing the two VGA BIOS ROMs in the VGA BIOS 122 (see FIG. 13). MEMCS16 is a chip select signal sent to the host computer.

A signal called IBMRDY is generated by flip-flop 667 and OR gate 668. Flip flop 667 outputs a signal labelled RDY2 whenever RDY1 (which is generated by the control logic 140) is enabled. This flip flop 667 is cleared by the signal CLRRDY, generated by PLA 660, when the host controller is ready to respond to a memory or I/O read, or to a interrupt status read or write operation. The PLA equations for the signals generated by PLA 660 are listed in Table 13.

PLA 670 latches in the memory and I/O read and write signals IBMBHE, IBMMEMR, IBMMEMW, IBMIOR, IBMIOW, and IBMA0 to generated CBHE, CMRD, CMWR, CIOR and CIOW. CWR is latched as enabled when either a memory or I/O write operation is being performed, and WDCLK is an asynchronous version of CWR. The PLA equations for the signals generated by PLA 670 are listed in Table 14.

TABLE 12

HOST CONTROLLER PLA EQUATIONS FOR PLA 650

```
FIELD address = [A11..A3];
KBD_RNG     = address:[260..26F];
LPT2_RNG    = address:[278..27f];
COM2_RNG    = address:[2F8..2FF];
LPT1_RNG    = address:[378..37F];
VIO_RNG     = address:[3C0..3DF];
COM1_RNG    = address:[3F8..3FF];
XTRA_RNG    = address:[210..21F];
XTRA1_RNG   = address:[220..22F];
/** Logic Equations **/
RDINTS = XTRA_RNG & IBMIOR & !IBMAEN;
WRINTS = XTRA_RNG & IBMIOW & !IBMAEN;
SLVWR = XTRA1_RNG & IBMIOW & !IBMAEN;
VIOCS   = (VIO_RNG # KBD_RNG
          # LPT2_RNG & ENLPT
          # COM2_RNG & ENCOM
          # LPT1_RNG & ENLPT
          # COM1_RNG & ENCOM)
          & (IBMIOR # IBMIOW) & !IBMAEN & SYSEN;
IOCS16 = VIO_RNG & (IORD # IOWR) & SYSEN;
```

TABLE 13

HOST CONTROLLER PLA EQUATIONS FOR PLA 660

```
FIELD address = [A19..A15];
MRD = IBMMEMR
MWR = IBMMEMW
BIOS_RNG    = address:[C0000..C7FFF] & LOMEG;
VMEM_RNG    = address:[A0000..AFFFF] & LOMEG
              # address:[B8000..BFFFF] & LOMEG;
VMEMCS      = VMEM_RNG & (MRD # MWR) & !REFRESH;
/** Logic Equations **/
BIOSCSU =      BIOS_RNG & MRD & !REFRESH & IBMBHE & SYSEN;
BIOSCSL =      BIOS_RNG & MRD & !REFRESH & !IBMA0 & SYSEN;
BDATDIR =      BIOS_RNG & MRD & !REFRESH & IBMBHE
             # BIOS_RNG & MRD & !REFRESH & !IBMA0
             # RDINTS;
SLREQ =        VIOCS # VMEMCS & SYSEN;
MEMCS16 =      BIOS_RNG & !REFRESH & SYSEN      /* & bhe */
             # BIOS_RNG & !REFRESH & SYSEN      /* & !a0 */
             # VMEM_RNG & !REFRESH & SYSEN;
CLRRDY = !SLREQ & !RDINTS & !WRINTS & !SLVWR;
```

TABLE 14

HOST CONTROLLER PLA EQUATIONS FOR PLA 670

```
/* SIGNALS LATCHED BY ADCLK */
CBHE    := IBMBHE
CMRD    := IBMMEMR
CMWR    := IBMMEMW
CIOR    := IBMIOR
CIOW    := IBMIOW
CA0     := IBMA0
CWR     := IBMMEMW # IBMIOW
/* ASYNCHRONOUS SIGNAL */
WDCLK = IBMMEMW # IBMIOW
```

Host Controller: VGA BIOS and BUS Buffer

Figure 13:
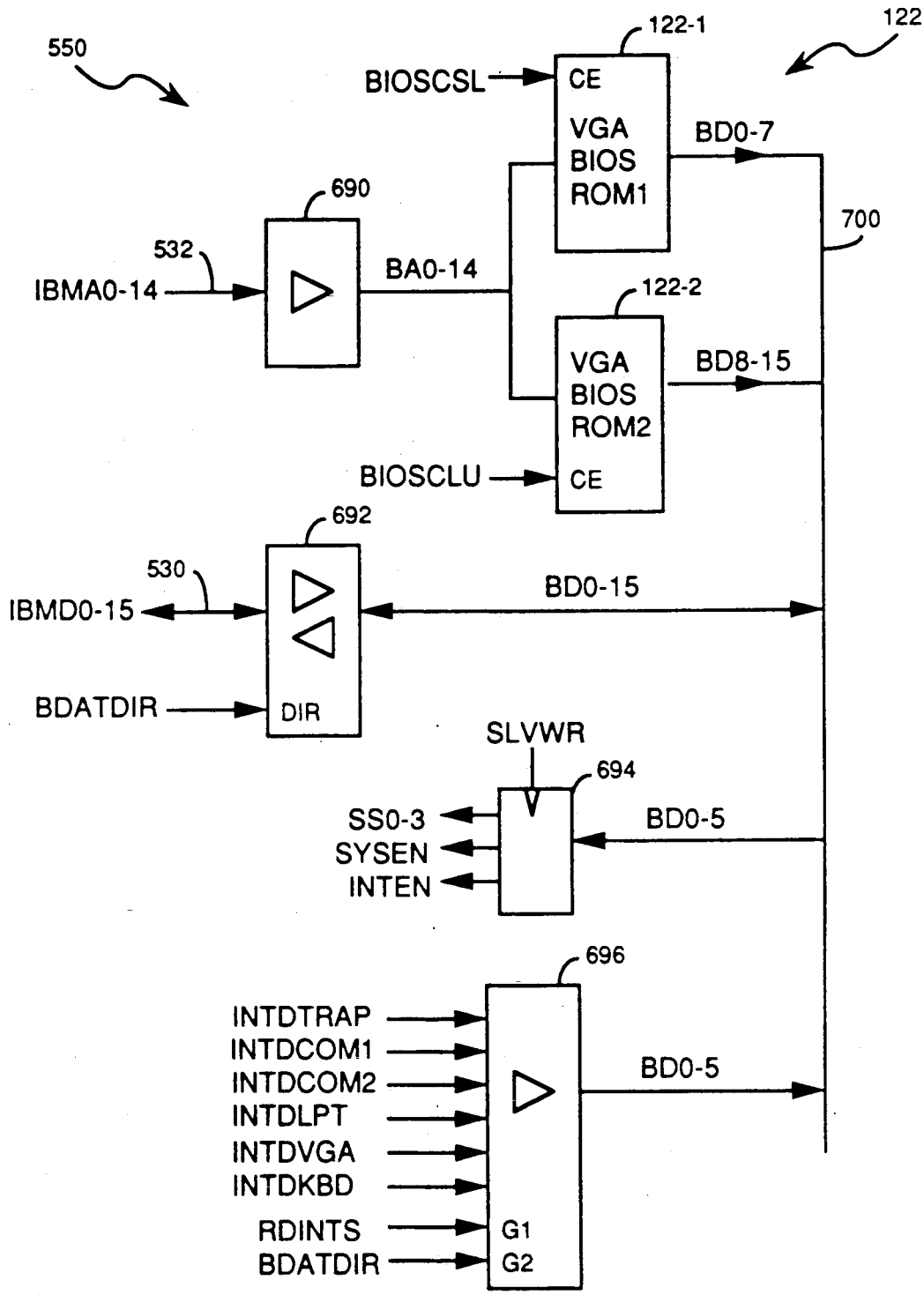
FIG. 13 is a block diagram of the VGA BIOS and bus buffer in the host controller shown in FIG. 8.

Referring to FIG. 13, the VGA BIOS 122 comprises a lower BIOS ROM 122-1 and an upper BIOS ROM 122-2, corresponding to the lower and upper bytes of the VGA BIOS software program. The lower BIOS ROM 122-1 is enabled by the BIOSCSL signal and the upper BIOS ROM 122-2 is enabled by the BIOSCSU signal. The BIOSCSL and BIOSCSU signals are generated by PLA 660 in the bus decoder 540, as discussed above.

A buffer 690 transmits the address signals on the lines IBM0 through IBM14 of the host computer's address bus 532 onto an internal address bus with lines BA0 through BA14. When one of the VGA BIOS ROMs is enabled, the enabled ROM is addressed by address signals BA0 through BA14. The outputs from the enabled ROM are asserted on an internal data bus 700 having lines labelled BD0 through BD15.

A bidirectional buffer 692 couples the internal data bus 700 to the data bus 530 of the host computer. The direction of data flow through the buffer 692 is determined by the signal BDATDIR, which is generated by PLA 660 in the bus decoder 540.

The internal data bus 700 is also used to receive the workstation ID sent by the host computer on its data bus to the workstation, via buffer 692. When the signal SLVWR is generated, the data on lines BD0 through BD5 is latched into latch 694, to generate signals SS0-3 which denote the workstation ID of the workstation being addressed by the host computer, as well as signals SYSEN and INTEN.

Finally, buffer 696 is used to send interrupt status information to the host computer via the internal data bus 700 and buffer 692. The buffer 696 is enabled when BDATDIR is enabled, allowing data to be sent to the host computer, and RDINTS is enabled, indicating that the host computer has requested interrupt status information.

Host Controller: Control Logic

Figure 14:
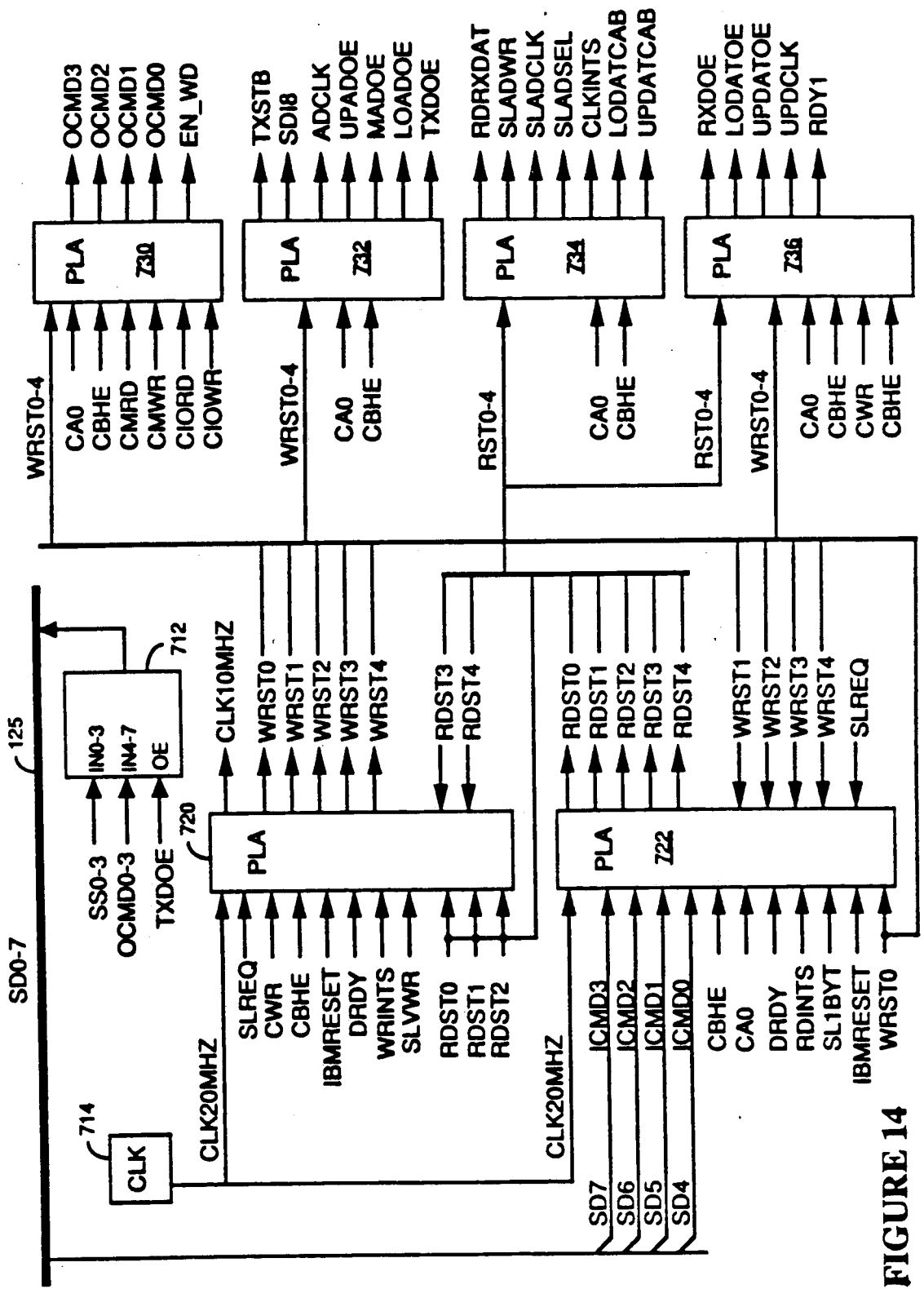
FIGS. 14 is a block diagram of the control logic in the host controller shown in FIG. 8.

Referring to FIG. 14, the control logic 140 for the host controller 110 includes an eight bit buffer 712, a 20 megahertz clock generator 714, and six PLAs 720, 722, 730, 732, 734 and 736.

The eight bit buffer 712 is used to generate the data packet header for data packets sent by the host controller 110. In particular, this buffer 712 asserts the workstation ID SS0-3 and a four bit output command value OCMD0-3 when the signal TXDOE is enabled. The workstation ID SS0-3 is stored in latch 694, shown in FIG. 13. The output command OCMD0-3 is generated by PLA 730.

Clock circuit 714 generates a 20 MHz clock signal CLK20MHZ that is used by the main programmed logic arrays 720 and 722 to control the pace of state transitions in the read and write state machines. It should be noted that, in general, the clock rate used by the read and write state machines in the host controller 110 should operate at twice the rate that data bytes are sent and received from the optical network.

Next, we describe the operation of the programmed logic arrays (PLAs) 720, 722, 730, 732, 734, and 736 in the control logic 140.

PLA 720 is the PLA which implements the write state machine described above with respect to FIG. 9. The hexadecimal state values shown in FIG. 9 and listed in Table 10 correspond to the value of signals WRST0-4 output by PLA 720. PLA 720 also outputs a 10 MHz clock signal CLK10MHZ, generated by dividing the 20 MHz signal CLK20MHZ. CLK10MHZ is the clock signal used by the transmitter 502.

Appendix 3 contains a pseudocode program which denotes the conditions required to move from each logical state to another logical state in the write state machine. Table 15 contains the equations for the intermediate signals used by the PLA 720 for controlling these state transitions.

PLA 722 is the PLA Which implements the read state machine described above with respect to FIG. 10. The hexadecimal state values shown in FIG. 10 and listed in Table 11 correspond to the value of signals RDST0-4 output by PLA 722. Appendix 4 contains a pseudocode program which denotes the conditions required to move from each logical state to another logical state in the read state machine. Table 16 lists the equations for the intermediate signals used by the PLA 722 for controlling these state transitions.

PLA 730 generates the output command values used in data packets generated by the host controller 110. PLA 730 also generates a signal EN_WD which is enabled when the write state machine is in any of its wait states: WAIT_RESET, WAIT_WR or WAIT_RD. Table 17 lists the PLA equations for the output signals generated by PLA 420.

PLA 732 generates the tag bit SDI8 (tag bit SDI9 is always off) for data packets transmitted by the host controller. It also generates the transmit strobe signal TXSTB, the address strobe ADCLK for the bus interface, the output enable signals clock signals UPADOE, MADOE and LOADOE for loading address values from the bus interface 120 onto the internal bus 125, and the packet header output enable signal TXDOE. Table 18 lists the PLA equations for generating these signals.

PLA 734 generates the strobe signal RDRXDAT for strobing the output port of the FIFO 510, and four control signals for the interrupt logic SLADWR, SLADCLK, SLADSEL and CLKINTS which will be discussed below with reference to FIG. 15. PLA 734 also generates the two data strobe signals LODATCAB and UPDATCAB used in the bus interface 120. Table 19 lists the PLA equations for generating these signals.

PLA 736 generates the RXDOE output enable circuit which enables outputs from FIFO 510 to be asserted on the internal bus 125, output enable signals UPDATOE and LODATOE used in the bus interface 120 (see FIG. 11), an update clock UPDCLK used in the interrupt logic 560 (see FIG. 15) and the RDY1 signal used in the bus decoder 540 to generate a ready signal IBMRDY sent to the host computer. Table 20 lists the PLA equations for generating these signals.

TABLE 15

| HOST CONTROLLER PLA EQUATIONS FOR PLA 720 |  |
| --- | --- |
| LB_REQ | = !CA0 & !CBHE; |
| HB_REQ | = CA0 & CBHE; |
| WORD_REQ | = !CA0 & CBHE; |
| BYTE_REQ | = LB_REQ # HB_REQ; |
| WR_REQ | = CWR;   /* IOWR # MWR; */ |
| BYTE_WRITE | = WR_REQ & (LB_REQ # HB_REQ); |
| WORD_WRITE | = WR_REQ & WORD_REQ; |
| /* Reset Signal from Host Computer*/ |  |
| WRST0-4 CLEARED BY IBMRESET |  |

TABLE 16

| HOST CONTROLLER PLA EQUATIONS FOR PLA 722 |  |
| --- | --- |
| IORD_W_ACK | = !ICMD3 & !ICMD2 & !ICMD1 & !ICMD0; |
| MEMR_W_ACK | = !ICMD3 & !ICMD2 & !ICMD1 & ICMD0; |
| IOWR_W_ACK | = !ICMD3 & !ICMD2 & ICMD1 & !ICMD0; |
| MEMW_W_ACK | = !ICMD3 & !ICMD2 & ICMD1 & ICMD0; |
| IORD_HB_ACK | = !ICMD3 & ICMD2 & !ICMD1 & !ICMD0; |
| IORD_LB_ACK | = !ICMD3 & ICMD2 & !ICMD1 & ICMD0; |
| MEMR_HB_ACK | = !ICMD3 & ICMD2 & ICMD1 & !ICMD0; |
| MEMR_LB_ACK | = !ICMD3 & ICMD2 & ICMD1 & ICMD0; |
| IOWR_HB_ACK | = ICMD3 & !ICMD2 & !ICMD1 & !ICMD0; |
| IOWR_LB_ACK | = ICMD3 & !ICMD2 & !ICMD1 & ICMD0; |
| MEMW_HB_ACK | = ICMD3 & !ICMD2 & ICMD1 & !ICMD0; |
| MEMW_LB_ACK | = ICMD3 & !ICMD2 & ICMD1 & ICMD0; |
| RESET_ACK | = ICMD3 & ICMD2 & !ICMD1 & !ICMD0; |
| STAT_ACK | = ICMD3 & ICMD2 & !ICMD1 & ICMD0; |
| NETCLR_ACK | = ICMD3 & ICMD2 & ICMD1 & !ICMD0; |
| XTRA_ACK | = ICMD3 & ICMD2 & ICMD1 & ICMD0; |
| HOST1BYTE | = !SDO9 & SDO8; |
| SL2BYTE | = SDO9 & !SDO8; |
| SL1BYTE | = SDO9 & SDO8; |
| WRITE_ACK = | IOWR_W_ACK   # MEMW_W_ACK   :OWR_HB_ACK |

TABLE 16-continued

HOST CONTROLLER PLA EQUATIONS FOR PLA 722

```
                # IOWR_LB_ACK    # MEMW_HB_ACK   # MEMW_LB_ACK;
READ_ACK =      IORD_W_ACK       # MEMR_W_ACK    # IORD_HB_ACK
                # IORD_LB_ACK    # MEMR_HB_ACK   # MEMR_LB_ACK;
/* Reset Signal from Host Computer*/
RDST0-4 CLEARED BY IBMRESET
```

TABLE 17

HOST CONTROLLER PLA EQUATIONS FOR PLA 730

```
$DEFINE IORD_W_CMD       = 0      /* Values denoted in  */
$DEFINE MEMR_W_CMD       = 1      /* Hexadecimal        */
$DEFINE IOWR_W_CMD       = 2      /* format             */
$DEFINE MEMW_W_CMD       = 3
$DEFINE IORD_HB_CMD      = 4
$DEFINE IORD_LB_CMD      = 5
$DEFINE MEMR_HB_CMD      = 6
$DEFINE MEMR_LB_CMD      = 7
$DEFINE IOWR_HB_CMD      = 8
$DEFINE IOWR_LB_CMD      = 9
$DEFINE MEMW_HB_CMD      = A
$DEFINE MEMW_LB_CMD      = B
$DEFINE RESET_CMD        = C
$DEFINE STAT_CMD         = D      /* Not Used */
$DEFINE NETCLR_CMD       = E
$DEFINE XTRA_CMD         = F      /* Not Used */
OCMD0-3 =
    NETCLR_CMD      & (wrstate:SEND_NETCLR1)
  # NETCLR_CMD      & (wrstate:CLR_DN1)
  # NETCLR_CMD      & (wrstate:SND_RD_CLR)
  # NETCLR_CMD      & (wrstate:RD_CLR_DN)
  # RESET_CMD       & (wrstate:START_RESET)
  # RESET_CMD       & (wrstate:RESET_DN)
  # IORD_W_CMD      & (wrstate:START_RW        & IORD   & WORD_REQ)
  # IORD_W_CMD      & (wrstate:START_RW_DN     & IORD   & WORD_REQ)
  # MEMR_W_CMD      & (wrstate:START_RW        & MRD    & WORD_REQ)
  # MEMR_W_CMD      & (wrstate:START_RW_DN     & MRD    & WORD_REQ)
  # IOWR_W_CMD      & (wrstate:START_RW        & IOWR   & WORD_REQ)
  # IOWR_W_CMD      & (wrstate:START_RW_DN     & IOWR   & WORD_REQ)
  # MEMW_W_CMD      & (wrstate:START_RW        & MWR    & WORD_REQ)
  # MEMW_W_CMD      & (wrstate:START_RW_DN     & MWR    & WORD_REQ)
  # IORD_HB_CMD     & (wrstate:START_RW        & IORD   & HB_REQ)
  # IORD_HB_CMD     & (wrstate:START_RW_DN     & IORD   & HB_REQ)
  # IORD_LB_CMD     & (wrstate:START_RW        & IORD   & LB_REQ)
  # IORD_LB_CMD     & (wrstate:START_RW_DN     & IORD   & LB_REQ)
  # MEMR_HB_CMD     & (wrstate:START_RW        & MRD    & HB_REQ)
  # MEMR_HB_CMD     & (wrstate:START_RW_DN     & MRD    & HB_REQ)
  # MEMR_LB_CMD     & (wrstate:START_RW        & MRD    & LB_REQ)
  # MEMR_LB_CMD     & (wrstate:START_RW_DN     & MRD    & LB_REQ)
  # IOWR_HB_CMD     & (wrstate:START_RW        & IOWR   & HB_REQ)
  # IOWR_HB_CMD     & (wrstate:START_RW_DN     & IOWR   & HB_REQ)
  # IOWR_LB_CMD     & (wrstate:START_RW        & IOWR   & LB_REQ)
  # IOWR_LB_CMD     & (wrstate:START_RW_DN     & IOWR   & LB_REQ)
  # MEMW_HB_CMD     & (wrstate:START_RW        & MWR    & HB_REQ)
  # MEMW_HB_CMD     & (wrstate:START_RW_DN     & MWR    & HB_REQ)
  # MEMW_LB_CMD     & (wrstate:START_RW        & MWR    & LB_REQ)
  # MEMW_LB_CMD     & (wrstate:START_RW_DN     & MWR    & LB_REQ)
EN_WD =     wrstate:WAIT_RESET    /* Enables Watchdog */
          # wrstate:WAIT_WR
          # wrstate:WAIT_RD;
```

TABLE 18

HOST CONTROLLER PLA EQUATIONS FOR PLA 732

```
LB_REQ    = !CA0 & !CBHE;
HB_REQ    = CA0 & CBHE;
WORD_REQ  = !CA0 & CBHE;
BYTE_REQ  = LB_REQ # HB_REQ;
TXSTB =     wrstate:START_RW_DN      # wrstate:HIADD_DN
          # wrstate:MADD_DN          # wrstate:LOADD_DN
          # wrstate:WAIT_RESET       # wrstate:WR_BYTE1_DN
          # wrstate:WR_BYTE2_DN      # wrstate:RD_CLR_DN
          # wrstate:CLR_DN1;
UPADOE   = wrstate:HIADD    # wrstate:HIADD_DN;
MADOE    = wrstate:MADD     # wrstate:MADD_DN;
LOADOE   = wrstate:LOADD    # wrstate:LOADD_DN;
TXDOE = wrstate:START_RW        # wrstate:START_RW_DN
      # wrstate:START_RESET      # wrstate:RESET_DN
      # wrstate:SND_RD_CLR       # wrstate:RD_CLR_DN
```

TABLE 18-continued
HOST CONTROLLER PLA EQUATIONS FOR PLA 732

```
          # wrstate:SEND_NETCLR1     # wrstate:CLR_DN1;
SDI8   =  wrstate:START_RW           # wrstate:START_RW_DN
          # wrstate:START_RESET      # wrstate:RESET_DN
          # wrstate:SND_RD_CLR       # wrstate:RD_CLR_DN
          # wrstate:SEND_NETCLR1     # wrstate:CLR_DN1;
ADCLK  =  wrstate:START_RW # wrstate:START_HOST_W;
```

TABLE 19
HOST CONTROLLER PLA EQUATIONS FOR PLA 734

```
LB_REQ      = !CA0 & !CBHE;
HB_REQ      = CA0 & CBHE;
WORD_REQ    = !CA0 & CBHE;
BYTE_REQ    = LB_REQ # HB_REQ;
RDRXDAT =       rdstate:RD_ACKNOL
            # rdstate:RD_BYTE1
            # rdstate:RD_BYTE2
            # rdstate:DUMP_BYTE
            # rdstate:END_RST
            # rdstate:END_WRITE
            # rdstate:STATUS_ACKNOL
            # rdstate:WR_STATUS;
SLADWR  =       rdstate:STATUS_ACKNOL  # rdstate:STATUS_AK1
            # rdstate:WR_STATUS        # rdstate:HOST_WR_STAT;
SLADCLK =       rdstate:STATUS_AK1;
LODATCAB=       rdstate:RD_BYTE1 & (LB_REQ # WORD_REQ);
UPDATCAB=       rdstate:RD_BYTE1 & HB_REQ
            # rdstate:RD_BYTE2;
CLKINTS =       rdstate:WR_STAT1 # rdstate:HOST_FIN_W;
SLADSEL =       rdstate:STATUS_ACKNOL  # rdstate:STATUS_AK1
            # rdstate:WR_STATUS        # rdstate:WR_STAT1;
```

TABLE 20
HOST CONTROLLER PLA EQUATIONS FOR PLA 736

```
LB_REQ      = !CA0 & !CBHE;
HB_REQ      = CA0 & CBHE;
WORD_REQ    = !CA0 & CBHE;
BYTE_REQ    = LB_REQ # HB_REQ;
RXDOE   =       wrstate:WR_IDLE & rdstate:RD_IDLE
            # wrstate:WAIT_WR
            # wrstate:WAIT_RD
            # rdstate:STATUS_ACKNOL
            # rdstate:STATUS_AK1
            # rdstate:WR_STATUS;
LODATOE =       wrstate:WR_BYTE1 & (LB_REQ # WORD_REQ)
            # wrstate:WR_BYTE1_DN & (LB_REQ # WORD_REQ)
            # rdstate:RD_BYTE1
            # rdstate:RD_BYTE1_WT
            # rdstate:RD_BYTE2
            # rdstate:RD_BYTE2_WT
            # rdstate:READY
            # rdstate:HOST_FIN_W
            # rdstate:HOST_WR_STAT;
UPDATOE =       wrstate:WR_BYTE1 & HB_REQ
            # wrstate:WR_BYTE1_DN & HB_REQ
            # wrstate:WR_BYTE2
            # wrstate:WR_BYTE2_DN
            # rdstate:RD_BYTE1
            # rdstate:RD_BYTE1_WT
            # rdstate:RD_BYTE2
            # rdstate:RD_BYTE2_WT
            # rdstate:READY;
RDY1    =       rdstate:HOST_RD_STATUS
            # rdstate:READY
            # rdstate:HOST_WR_STAT
            # wrstate:START_RW_DN & CWR
            # wrstate:ADDR_RDY;
UPDCLK  =       rdstate:WR_STAT1
            # rdstate:HOST_FIN_W
            # wrstate:UPD_INTS;
```

Host Controller: Watchdog Circuit and Interrupt Logic

Referring to FIG. 15, a simple watchdog circuit 740 is used to detect when the host controller has become stuck in any of the three write machine wait states: WAIT_RESET, WAIT_RD or WAIT_WR. PLA 730 (see FIG. 14) generates a watchdog enable signal EN_WD that triggers monostable 742 whenever the write machine enters one of the three wait states. Monostable 742 generates a pulse having a duration, such as 0.5 seconds, which is equal to a timeout period. At the end of the timeout period, if the write machine is still in the wait state, the flip-flop 744 will latch in a value of "1" and the watchdog error signal WD_ERR is enabled. If the write machine leaves the wait state before the end of the timeout period, as it normally would, then the flip-flop 744 is held in a cleared state and a WD_ERR signal is not generated. The monostable 742 is enabled only when an interrupt enable signal INTEN is received from the host computer via latch 694 (see FIG. 13).

Still referring to FIG. 15, the interrupt logic circuit 560 works as follows. A four bit latch 750 latches in the workstation ID from the internal bus 125 when strobed by the SLADCLK signal. The outputs of the latch 750 are labelled SLAD0 through SLAD3. A multiplexer 752 asserts either the outputs from latch 750 or the outputs SS0-3 from latch 694 in the bus buffer 550 on the address port of a high speed random access memory (RAM) 754, as determined by control signal SLADSEL. The workstation ID is taken from the latch 694 when the host computer is writing data into the RAM 754, and is taken from latch 750 when interrupt status data received from a workstation controller is being written into the RAM 754.

The RAM 754 outputs a set of six stored interrupt status values for the selected workstation identified by the four bit workstation ID asserted on its input port. The outputs of the RAM 754 are labelled INTDCOM1, INTDCOM2, INTDLPT, INTDVGA, INTDKBD and INTDTRAP. These interrupt status values are transmitted to the host computer via buffer 696 and the internal data bus 700, as previously shown in FIG. 13. The data values on lines SD0-5 of the bus 125 are loaded into the RAM 754 at the address for the specified workstation when the signal SLADWR is enabled.

A combined interrupt status signal for VGA and keyboard interrupts, called INTDKBVGA is generated by OR'ing the signals INTDKBD and INTDVGA with OR gate 760.

A latch 762 is used to latch signals INTDKBVGA (generated by OR gate 760) and INTDCOM1, INTDCOM2, INTDLPT, and INTDTRAP when strobed by the UPDCLK signal. The latch is cleared by the RST signal. The outputs of the latch are labelled INTCOM1, INTCOM2, INTLPT, INTTRAP and INTKBVG. INTCOM1 is coupled to a jumper connection point, which can be coupled by a jumper (not shown) to the IRQ4 line of the host computer. Similarly, INTCOM2 can be coupled to the IRQ3 line of the host computer, INTLPT can be coupled to either the IRQ5 or IRQ7 lines of the host computer, and INTKBVG can be coupled to the EGAINT line of the host computer.

The signal INTTRAP output by latch 762 is combined by a NOR gate in PLA 764 with the watchdog circuit's output signal WD_ERR, and the resulting signal INTTRAP/ is coupled to line driver 766, which drives the IOCHCHK line of the host computer when INTTRAP is enabled. Thus when the watchdog circuit detects that the host controller has become stuck in a wait state, an interrupt signal is generated on the IOCHCHK line, which prompts the host computer to perform a reset by sending a reset signal to the host controller.

OR gate 768 ORs signals INTDKBVGA (generated by OR gate 760) and INTDCOM1, INTDCOM2, INTDLPT, and INTDTRAP. The output of OR gate 762 is labelled ANYHI. The signal ANYHI is enabled if any of the interrupt values for the selected workstation are enabled.

PLA 768 contains sixteen internal latches which store an interrupt status value for each of the sixteen possible workstation IDs. The value of the signal ANYHI is strobed into the internal latch corresponding to the value SLAD0-3 when the clock signal CLKINTS is strobed. All sixteen internal status value latches are reset by the RST signal.

An additional internal latch (called the ANYINT latch) has an input which is enabled if any of the sixteen stored interrupt status values is enabled. The ANYINT latch is clocked by the signal UPDCLK. The output of the ANYINT latch is labelled ANYINT. ANYINT is enabled if any of the sixteen workstations has an enabled interrupt status line, indicating that at least one workstation has an interrupt that has not yet been serviced by the host computer. The ANYINT signal can be coupled to the EGAINT line of the host computer by a jumper. The ANYINT latch is reset by the signal INTEN, which is an interrupt enable signal received from the host computer and latched in latch 694 (see FIG. 13). Table 21 lists the PLA equations for PLA 768.

TABLE 21

| HOST CONTROLLER PLA EQUATIONS FOR PLA 758 |
|---|

```
/* FLIP-FLOPS CLOCKED BY CLKINTS: */
BDINT0.D    = ANYHI & SLAD=0 # BDINT0 & !(SLAD=0);
BDINT1.D    = ANYHI & SLAD=1 # BDINT1 & !(SLAD=1);
BDINT2.D    = ANYHI & SLAD=2 # BDINT2 & !(SLAD=2);
BDINT3.D    = ANYHI & SLAD=3 # BDINT3 & !(SLAD=3);
BDINT4.D    = ANYHI & SLAD=4 # BDINT4 & !(SLAD=4);
BDINT5.D    = ANYHI & SLAD=5 # BDINT5 & !(SLAD=5);
BDINT6.D    = ANYHI & SLAD=6 # BDINT6 & !(SLAD=6);
BDINT7.D    = ANYHI & SLAD=7 # BDINT7 & !(SLAD=7);
BDINT8.D    = ANYHI & SLAD=8 # BDINT8 & !(SLAD=8);
BDINT9.D    = ANYHI & SLAD=9 # BDINT9 & !(SLAD=9);
BDINT10.D   = ANYHI & SLAD=A # BDINT10 & !(SLAD=A);
BDINT11.D   = ANYHI & SLAD=B # BDINT11 & !(SLAD=B);
BDINT12.D   = ANYHI & SLAD=C # BDINT12 & !(SLAD=C);
BDINT13.D   = ANYHI & SLAD=D # BDINT13 & !(SLAD=D);
BDINT14.D   = ANYHI & SLAD=E # BDINT14 & !(SLAD=E);
BDINT15.D   = ANYHI & SLAD=F # BDINT15 & !(SLAD=F);
/* ALL SIXTEEN FF'S BDINT0-15 RESET BY 'RST' SIGNAL */
BDINT0.R:BDINT15.R = RST
/* FLIP-FLOP CLOCKED BY 'UPDCLK' AND RESET BY 'INTEN/': */
ANYINT.D = BLINT0 # BLINT1 # ... BDINT15
/* NOR GATE OUTPUTS 'INTTRAP/' SIGNAL: */
```

| TABLE 21-continued |
|---|
| HOST CONTROLLER PLA EQUATIONS FOR PLA 758 |
| INTTRAP/ = !(INTTRAP # WD_ERR); |

Alternate Embodiments

The present invention can be used in a much wider variety of applications than the one shown in the preferred embodiment. For instance, the present invention could be used in an extended multiprocessor system in which the various processors share memory. The communication bus and the controllers used in the present invention could be used to regenerate the memory bus signals corresponding to various memory access operations so as to facilitate the sharing of remotely located memories.

In another anticipated application of the present invention, smart workstations would be used, and the communications bus and workstation controllers would interface with a communications port on each workstation. The workstations need not have the same computer architecture as the host computer. The present invention would serve as a mechanism for interconnecting remotely located computers, without having to resort to a local area network with the attendant software overhead.

It should also be understood that the present invention can be used with communication busses other than the ring architecture shown. Particularly in applications which will have the host computer performing a significant number of read operations, it may advantageous to use linear, full duplex, communication bus structures.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

APPENDIX 1

WORKSTATION CONTROLLER STATE TRANSITION DEFINITIONS

```
present IDLE
    if !RXFIFO_RDY & !INTCHNG
      next IDLE;
    if !RXFIFO_RDY & INTCHNG
      next SEND_STAT_CMD;
    if RXFIFO_RDY & HOST1BYTE & !ADDRMATCH
      next PASS_HOST_DN;
    if RXFIFO_RDY & RESET_CMD & HOST1BYTE
      next START_RST;
    if RXFIFO_RDY & NETCLR_CMD & HOST1BYTE
      next PASS_NETCLR;
    if RXFIFO_RDY & M_OR_IO & HOST1BYTE & ADDRMATCH
      next LATCMD;
    default            /* if RXFIFO_RDY & !HOST1BYTE */
      next PASS_SLAVE_DN;

/*====================================================*/
/* PASSTHRU OTHER SLAVES RESPONSES BACK TO HOST       */
/*====================================================*/
  present PASS_SLAVE_DN
      next IDLE;

/*====================================================*/
/* PASSTHRU NETCLEAR TO REST OF NETWORK         */
/*====================================================*/
  present PASS_NETCLR
      next IDLE;

/*====================================================*/
/* RESET RECEIVED FROM HOST- PERFORM RESET FOR CHIPS AND
THEN SEND BACK ACK */
```

```
/*===================================================*/
   present START_RST
     if !RESET
       next SEND_RST_ACK;
   default
       next START_RST;

present SEND_RST_ACK
       next RST_ACK_DN;

present RST_ACK_DN
       next IDLE;
/*===================================================*/
/* FORWARD A HOST COMMAND TO THE NEXT SLAVE */
/* AND WAIT FOR NETCLR */
/*===================================================*/
   present PASS_HOST_DN
       next PASS_OTHER;

present PASS_OTHER
     if !RXFIFO_RDY
       next PASS_OTHER;
     if RXFIFO_RDY & NETCLR_CMD & HOST1BYTE
       next NETCLR_DN;
     default
       next PASS_OTHER_DN;

present PASS_OTHER_DN
       next PASS_OTHER;

present NETCLR_DN
       next IDLE;

/*===================================================*/
/* SEND A STATUS PACKET BACK TO THE HOST */
/*===================================================*/
   present SEND_STAT_CMD
       next STAT_CMD_DN;

present STAT_CMD_DN
       next SEND_STAT;

present SEND_STAT
       next STAT_DN;

present STAT_DN
       next IDLE;

/*===================================================*/
/* MAIN OPERATIONS SEQUENCE
     -- MEM, I/O READ AND WRITE OCCUR HERE */
/*===================================================*/
   present LATCMD
       next POP_CMD;
```

```
    present POP_CMD
      if RXFIFO_RDY
        next LATHIAD;
      default
        next POP_CMD;

/* */
  present LATHIAD
      next POP_HIAD;

present POP_HIAD
      if RXFIFO_RDY
        next LATMAD;
      default
        next POP_HIAD;

/* */
  present LATMAD
      next POP_MAD;

present POP_MAD
      if RXFIFO_RDY
        next LATLOAD;
      default
        next POP_MAD;

/* */
  present LATLOAD
      next POP_LOAD;

present POP_LOAD
      if READ_CMD
        next START_RD;
      if !READ_CMD & RXFIFO_RDY
        next WR_BYTE1;
      default
        next POP_LOAD;

/* HERE IS READ FINISH... */
  present START_RD
      next SEND_RD_ACK;

present SEND_RD_ACK
      next RD_ACK_DN;

present RD_ACK_DN
      if CYDONE
        next SEND_BYTE1;
      default
        next RD_ACK_DN;

present SEND_BYTE1
      next BYTE1_DN;
```

```
    present BYTE1_DN
      if WORD_RD_CMD
        next IDLE;
      default
        next SEND_BYTE2;

present SEND_BYTE2
      next BYTE2_DN;

present BYTE2_DN
      next IDLE;

/* HERE IS WRITE FINISH... */
    present WR_BYTE1
      next POP_BYTE1;

present POP_BYTE1
      if !WORD_WR_CMD
        next START_WR;
      if WORD_WR_CMD & RXFIFO_RDY
        next WR_BYTE2;
      default
        next POP_BYTE1;

present WR_BYTE2
      next POP_BYTE2;

present POP_BYTE2
      next START_WR;

present START_WR
      if CYDONE
        next SEND_WR_ACK;
      default
        next START_WR;

present SEND_WR_ACK
      next WR_ACK_DN;

present WR_ACK_DN
      next IDLE;
```

APPENDIX 2

CYCLE STATE TRANSITION DEFINITIONS FOR PLA 360

```
/* CYCLE STATE MACHINE'S STATES: */
/*      CYC_IDLE(0), ST_IO (1), ST_MEM(4),    */
/*      END_CMD(5), CLR_CSS(7)                */

SEQUENCE cycstate {
  present CYC_IDLE
    if ST_CYCLE & IO_CMD_L
      next ST_IO;
    if ST_CYCLE & MEM_CMD_L
      next ST_MEM;
    default
      next CYC_IDLE;
```

```
/*===================================================*/
/* DO IO CYCLE- MINIMUM OF 50NS CMD LOW...*/
/*===================================================*/
  present ST_IO
    if RDY # VGARDY
      next END_CMD;
    default
      next ST_IO;

/*===================================================*/
/* DO MEMORY CYCLE- MIN OF 50NS CMD LOW...*/
/*===================================================*/
  present ST_MEM
    if RDY # VGARDY
      next END_CMD;
    default
      next ST_MEM;

/*===================================================*/
/* FINISH ANY CYCLE              */
/*===================================================*/
  present END_CMD
     next CLR_CSS;

present CLR_CSS
     next CYC_IDLE;
```

APPENDIX 3

WRITE STATE TRANSITION DEFINITIONS

```
  present WR_IDLE
    if rdstate:RD_IDLE & DRDY & WRINTS
      next START_HOST_W;
    if rdstate:RD_IDLE & DRDY & SLVWR
      next START_ADDR_CHG;
    if rdstate:RD_IDLE & DRDY & SLREQ & CLK10MHZ
      next START_RW;
    default
      next WR_IDLE;

/*===================================================*/
/* HOST-WRITE-INTERRUPT-VALUES-TO-RAM SEQUENCE */
/*===================================================*/
  present START_HOST_W
    if !WRINTS
      next WR_IDLE;
  default
    next START_HOST_W;

/*=====================================================*/
/* HOST-WRITE-NEW-SLAVE-ADDRESS SEQUENCE */
/*=====================================================*/
  present START_ADDR_CHG
     next ADDR_DY;
```

```
   present ADDR_RDY
     if !SLVWR
       next UPD_INTS;
   default
     next ADDR_RDY;

present UPD_INTS
     next WR_IDLE;

/*======================================*/
/* HERE IS THE ADDRESS OUTPUT SEQUENCE */
/*======================================*/
   present START_RW
     next START_RW_DN;

present START_RW_DN
     next HIADD;

present HIADD
     next HIADD_DN;

present HIADD_DN
     next MADD;

present MADD
     next MADD_DN;

present MADD_DN
     next LOADD;

present LOADD
     next LOADD_DN;

present LOADD_DN
     if WR_REQ
       next WR_BYTE1;
     default
       next WAIT_RD;

/*============================*/
/* MAIN WRITE "END" SEQUENCE */
/*============================*/
   present WR_BYTE1
     if !SLREQ & !CLK10MHZ
       next WR_BYTE1_DN;
     default
       next WR_BYTE1;

present WR_BYTE1_DN
     if BYTE_WRITE
       next SEND_NETCLR1;
     default
       next WR_BYTE2;
```

```
   present WR_BYTE2
      next WR_BYTE2_DN;

present WR_BYTE2_DN
      next SEND_NETCLR1;

present SEND_NETCLR1
      next CLR_DN1;

present CLR_DN1
      next WAIT_WR;

present WAIT_WR
      if rdstate:END_WRITE
      next WR_IDLE;
      default
      next WAIT_WR;

/*====================*/
/* READ "END" SEQUENCE */
/*====================*/
   present WAIT_RD
      if rdstate:READY
      next SND_RD_CLR;
      default
      next WAIT_RD;
   present SND_RD_CLR
      if !CLK10MHZ
      next RD_CLR_DN;
      default
      next SND_RD_CLR;

present RD_CLR_DN
      next WR_IDLE;

/*====================*/
/* HARD RESET SEQUENCE */
/*====================*/
   present WR_HARD_RESET
      if SLREQ          /* Watchdog Timer Generated Reset */
      next WR_IDLE;
      default
      next START_RESET;

present START_RESET
      if !CLK10MHZ
      next RESET_DN;
      default
      next START_RESET;

present RESET_DN
      next WAIT_RESET;

present WAIT_RESET
      if rdstate:END_RS
      next WR_IDLE;
      default
      next WAIT_RESET;
```

```
/*================================*/
/* ALL UNDEFINED STATES GO TO IDLE */
/*================================*/
/*  present WR_XTRA1
      next WR_IDLE;

present WR_XTRA2
      next WR_IDLE;

present WR_XTRA3
      next WR_IDLE;

present WR_XTRA4
      next WR_IDLE;

present WR_XTRA5
      next WR_IDLE;
```

APPENDIX 4

READ STATE TRANSITION DEFINITIONS

```
   present RD_IDLE
      if DRDY & !RDINTS & !(wrstate:START_HOST_W)
        next RD_IDLE;
      if DRDY & wrstate:START_HOST_W
        next HOST_WR_STAT;
      if DRDY & RDINTS
        next HOST_RD_STATUS;
      if RXFIFO_RDY & (wrstate:WR_IDLE # wrstate:WAIT_WR
                # wrstate:WAIT_RD) & SL1BYTE & STAT_ACK
        next STATUS_ACKNOL;
      if RXFIFO_RDY & wrstate:WAIT_WR & SL1BYTE & WRITE_ACK
        next END_WRITE;
      if RXFIFO_RDY & wrstate:WAIT_RESET & RESET_ACK
        next END_RST;
      if RXFIFO_RDY & wrstate:WAIT_RD & SL1BYTE & READ_ACK
        next RD_ACKNOL;
      default
        next DUMP_BYTE;

/*================================*/
/* DUMP BYTE SEQUENCE */
/*================================*/
   present DUMP_BYTE
      next RD_IDLE;

/*======================================================*/
/* STATUS READ REQUEST FROM THE HOST DURING IDLE */
/*======================================================*/
   present HOST_RD_STATUS
      if !RDINTS
        next RD_IDLE;
      default
        next HOST_RD_STATUS;
```

```
/*==============================================================*/
/* STATUS WRITE REQUEST FROM THE HOST DURING IDLE */
/*==============================================================*/
   present HOST_WR_STAT
     if !(wrstate:START_HOST_W)
       next HOST_FIN_W;
     default
       next HOST_WR_STAT;

present HOST_FIN_W
       next RD_IDLE;

/*==============================*/
/* HERE IS THE STATUS SEQUENCE */
/*==============================*/
   present STATUS_ACKNOL
       next STATUS_AK1;

present STATUS_AK1
     if RXFIFO_RDY
       next WR_STATUS;
     default
       next STATUS_AK1;

present WR_STATUS
       next WR_STAT1;

present WR_STAT1
       next RD_IDLE;

/*================================*/
/* WRITE END SEQUENCE */
/*================================*/
   present END_WRITE
       next RD_IDLE;

/*================================*/
/* RESET END SEQUENCE */
/*================================*/
   present END_RST
       next RD_IDLE;

/*================================*/
/* MAIN READ "END" SEQUENCE */
/*================================*/
   present RD_ACKNOL
       next RDACK_DN;

present RDACK_DN
     if RXFIFO_RDY
       next RD_BYTE1;
     default
       next RDACK_DN;

present RD_BYTE1
       next RD_BYTE1_WT;
```

```
  present RD_BYTE1_WT
    if RXFIFO_RDY & WORD_REQ
     next RD_BYTE2;
    if !WORD_REQ
     next READY;
    default
     next RD_BYTE1_WT;

/* READ 2ND BYTE OF WORD */
  present RD_BYTE2
     next RD_BYTE2_WT;

present RD_BYTE2_WT
     next READY;

present READY
    if !SLREQ
     next RD_IDLE;
    default
     next READY;

/*===================================================*/
/* HERE IS HARD RESET OR WATCHDOG ERROR SEQUENCE */
/*===================================================*/
  present RD_HARD_RESET
    if SLREQ
     next READY;
    default
     next RD_IDLE;

/*===================================*/
/* DEFAULT ALL UNUSED STATES TO IDLE */
/*===================================*/
  present RD_XTRA1
     next RD_IDLE;

present RD_XTRA2
     next RD_IDLE;

present RD_XTRA3
     next RD_IDLE;

present RD_XTRA4
     next RD_IDLE;

present RD_XTRA5
     next RD_IDLE;

present RD_XTRA6
     next RD_IDLE;

present RD_XTRA7
     next RD_IDLE;

present RD_XTRA8
     next RD_IDLE;
```

```
present RD_XTRA9
   next RD_IDLE;

present RD_XTRA10
   next RD_IDLE;

present RD_XTRA11
   next RD_IDLE;

present RD_XTRA12
   next RD_IDLE;

present RD_XTRA13
   next RD_IDLE;
```

What is claimed is:

1. A multistation computer system, comprising:

a host computer having an address bus, data bus and control bus;

a plurality of workstations coupled to said host computer; each said workstation having an address bus, data bus and control bus;

said host computer including means for initiating data transfers to and from said workstations by generating corresponding signals on the address bus, data bus and control bus of said host computer; said signals generated by said host computer including signals denoting a selected one of said workstations for each said data transfer;

host controller means, coupled to the address bus, data bus and control bus of said host computer, for monitoring said signals on the address bus, data bus and control bus of said host computer, and for generating a data packet representing said data transfer; each said data packet including data denoting the selected one of said workstations for said data transfer;

a plurality of workstation controller means, each coupled to one of said workstations; each workstation controller means including packet receiving means for receiving data packets generated by said host controller and for generating signals on said address bus, data bus and control bus of said workstation which correspond to said address bus, data bus and control bus signals in said host computer monitored by said host controller means and represented by said received data packet; and communication means, coupled to said host controller means and each of said workstation controller means, for transmitting said data packets from said host controller means to said workstation controller means.

2. The multistation computer system set forth in claim 1, each said data packet including means for denoting whether the corresponding data transfer is a write operation or a read operation and for denoting an address associated with said data transfer;

each of said workstation controller means including means for responding to data packets denoting a read operation by retrieving data from said workstation coupled to said workstation controller and for generating a responsive data packet denoting data corresponding to the address in said received data packet;

said communication means including means for transmitting said responsive data packets from said workstations controller means to said host controller means; and said host controller means including responsive packet receiving means for receiving responsive data packets generated by said workstation controllers and for generating signals on said data bus of said host computers which correspond to said data denoted in said received responsive data packets.

3. The multistation computer system set forth in claim 1, wherein said data transfers include a multiplicity of distinct types of data transfers; each distinct type of data transfer having an associated set of required timing relationships between the address, data and control bus signals generated by the controller means which receives the data packet representing said data transfer;

said host controller means including means for determining the type of each said data transfer initiated by said host computer, and for including data in said generated data packet denoting said data transfer type; and each said workstation controller means including state machine means for controlling timing relationships between said signals generated by said packet receiving means on said address bus, data bus and control bus of the workstation coupled to said workstation controller means so that said timing relationships meet said set of required timing relationships associated with the data transfer type denoted by each received data packet.

4. A multistation computer system, comprising:

a host computer having an address bus, data bus and control bus;

a plurality of workstations coupled to said host computer; each said workstation having an address bus, data bus and control bus;

said host computer including means for initiating data transfers to and from said workstations by generating corresponding signals on the address bus, data bus and control bus of said host computer; said signals generated by said host computer including signals denoting a selected one of said workstations for each said data transfer;

communications means for coupling the address, data and control bus of said host computer to the address, data and control buses of said workstations, said communications means including:

host controller means, coupled to the address bus, data bus and control bus of said host computer, for monitoring said signals on the address bus, data bus and control bus of said host computer, and for generating a data packet representing said host computer's address, data and control bus signals associated with said data transfer; each said data packet including data denoting a selected one of said workstations for said data transfer;

a plurality of workstation controller means, each coupled to one of said workstations; each workstation controller means including packet receiving means for receiving data packets generated by said host controller and for generating signals on said address bus, data bus and control bus of said workstation which correspond to said address bus, data bus and control bus signals in said host computer monitored by said host controller and represented by said received data packet; and communication bus means, coupled to said host controller means and each of said workstation controller means, for transmitting said data packets from said host controller means to said workstation controller means.

5. The multistation computer system set forth in claim 4, each said data packet including data denoting whether the corresponding data transfer is a write operation or a read operation and for denoting an address associated with said data transfer;

each of said workstation controller means including means for responding to data packets denoting a read operation by retrieving data from said workstation coupled to said workstation controller and for generating a responsive data packet denoting data corresponding to the address in said received data packet;

said communication bus means including means for transmitting said responsive data packets from said workstations controller means to said host controller means; and said host controller means including responsive packet receiving means for receiving responsive data packets generated by said workstation controllers and for generating signals on said data bus of said host computer which correspond to said data denoted in said received responsive data packets.

6. The multistation computer system set forth in claim 4, wherein said data transfers include a multiplicity of distinct types of data transfers; each distinct type of data transfer having an associated set of required timing relationships between the address, data and control bus signals generated by the controller means which receives the data packet representing said data transfer;

said host controller means including means for determining the type of each said data transfer initiated by said host computer, and for including data in said generated data packet denoting said data transfer type; and each said workstation controller means including state machine means for controlling timing relationships between said signals generated by said packet receiving means on said address bus, data bus and control bus of the workstation coupled to said workstation controller means so that said timing relationships meet said set of required timing relationships associated with the data transfer type denoted by each received data packet.

7. A multistation computer system, comprising:

a plurality of interconnected computer devices, each having an address bus, data bus and control bus;

at least one of said plurality of computer devices including means for initiating data transfers to and from other ones of said plurality of computer devices by generating corresponding bus signals on its address bus, data bus and control bus; said bus signals including signals denoting a selected one of said other ones of said plurality of computer devices for each said data transfer; said bus signals comprising those signals which would be required to perform data transfers to and from other computer devices directly coupled to said at least one of said plurality of computer devices's address, data and control buses;

communications means for coupling the address, data and control bus of said at least one of said plurality of computer devices to the address, data and control busses of said other ones of said plurality of computer devices, said communications means including:

a plurality of controller means, including one controller means coupled to each of said computer devices, each said controller means coupled to the address, data and control busses of a corresponding one of said plurality of computer devices;

each said controller means which is coupled to one of said computer devices with means for initiating data transfers including means for monitoring said bus signals on the address bus, data bus and control bus of said corresponding computer device and for generating a data packet representing said address, data and control bus signals associated with each data transfer initiated by said corresponding computer device; each said data packet including data denoting a selected one of said other computer devices for said data transfer;

each said controller means including packet receiving means for receiving data packets generated by other ones of said computer devices and for generating signals on said address bus, data bus and control bus of the computer device coupled to said controller means, said generated signals corresponding to said address bus, data bus and control bus signals represented by said received data packets; and data packet transmitting means, coupled to said plurality of controller means, for transmitting said data packets therebetween.

8. The multistation computer system set forth in claim 7, each said data packet including data denoting whether the corresponding data transfer is a write operation or a read operation and for denoting an address associated with said data transfer; and each of said controller means including means for responding to data packets denoting a read operation by retrieving data from said computer device coupled to said controller means and for generating a responsive data packet denoting data corresponding to the address in said received data packet.

9. The multistation computer system set forth in claim 7, wherein said data transfers include a multiplicity of distinct types of data transfers; each distinct type of data transfer having an associated set of required timing relationships between the address, data and control bus signals generated by the controller means which receives the data packet representing said data transfer;

each said controller means which is coupled to one of said computer devices with means for initiating data transfers including means for determining the type of each said data transfer initiated by said computer device, and for including data in said generated data packet denoting said data transfer type; and each said controller means including state machine means for controlling timing relationships between said signals generated by said packet receiving means on said address bus, data bus and control bus of the computer device coupled to said controller means so that said timing relationships meet said set of required timing relationships associated with the data transfer type denoted by each received data packet.

10. An extended computer bus apparatus, for use with a first computer device having an address bus, data bus and control bus, the extended computer bus apparatus comprising:

a host controller coupled to the address bus, data bus and control bus of said first computer device, for monitoring said address bus, data bus and control bus of said first computer device for signals corresponding to a data transfer between said first computer device and another specified computer device, and for generating a data packet representing said data transfer; each said data packet including data denoting said other specified computer device;

data packet transmitting means, coupled to said host controller for transmitting each said data packet to a location corresponding to the computer device specified by said data in said data packet;

a set of busses, including an address bus, data bus and control bus, at each of a plurality of distinct locations associated with said other computer devices specified by said data in said transmitted data packets; and a plurality of controllers, each coupling one of said sets of busses to said data packet transmitting means, each said controller including packet receiving means for receiving data packets and for generating signals on said address bus, data bus and control bus coupled to said controller, said generated signals corresponding to said address bus, data bus and control bus signals represented by said received data packets;

wherein said sets of busses at said plurality of distinct locations function as extensions of said address bus, data bus and control of said first computer device.

11. The extended computer bus apparatus, set forth in claim 10, wherein said data transfers include a multiplicity of distinct types of data transfers; each distinct type of data transfer having an associated set of required timing relationships between the signals generated on said address bus, data bus and control bus coupled to the controller which receives the data packet representing said data transfer;

said host controller including means for determining the type of each said data transfer initiated by said first computer device, and for including data in each said generated data packet denoting said data transfer type; and each said controller including state machine means for controlling timing relationships between said signals generated by said packet receiving means on said address bus, data bus and control bus coupled to said controller so that said timing relationships meet said set of required timing relationships associated with the data transfer type denoted by each received data packet.

* * * * *